United States Patent
Hakuta et al.

(10) Patent No.: US 10,708,062 B2
(45) Date of Patent: Jul. 7, 2020

(54) IN-VEHICLE INFORMATION COMMUNICATION SYSTEM AND AUTHENTICATION METHOD

(71) Applicant: CLARION CO., LTD., Saitama-shi, Saitama (JP)

(72) Inventors: Keisuke Hakuta, Tokyo (JP); Nobuyoshi Morita, Tokyo (JP); Eriko Ando, Tokyo (JP); Toru Owada, Tokyo (JP); Makoto Kayashima, Tokyo (JP)

(73) Assignee: CLARION CO., LTD., Saitama (JP)

( * ) Notice: Subject to any disclaimer, the term of this patent is extended or adjusted under 35 U.S.C. 154(b) by 323 days.

(21) Appl. No.: 15/737,845

(22) PCT Filed: Mar. 14, 2016

(86) PCT No.: PCT/JP2016/057939
§ 371 (c)(1),
(2) Date: Dec. 19, 2017

(87) PCT Pub. No.: WO2017/002405
PCT Pub. Date: Jan. 5, 2017

(65) Prior Publication Data
US 2019/0007215 A1    Jan. 3, 2019

(30) Foreign Application Priority Data

Jun. 29, 2015 (JP) .................. 2015-130315

(51) Int. Cl.
*H04L 9/32* (2006.01)
*H04L 29/06* (2006.01)
(Continued)

(52) U.S. Cl.
CPC ............ *H04L 9/3247* (2013.01); *G06F 21/44* (2013.01); *H04L 9/0869* (2013.01);
(Continued)

(58) Field of Classification Search
CPC ....... H04L 9/3247; H04L 9/0869; H04L 9/32; H04L 63/0435; H04L 63/123; G06F 21/44; G06F 8/64; H04W 12/06
See application file for complete search history.

(56) References Cited

U.S. PATENT DOCUMENTS 9,132,790 B2 * 9/2015 Miyake ............... B60R 16/0231
9,432,197 B2 * 8/2016 Naganuma ............. G06F 21/74
(Continued)

FOREIGN PATENT DOCUMENTS

JP    2004-348767 A    12/2004
JP    2015-076018 A    4/2015
(Continued)

OTHER PUBLICATIONS

Extended European Search Report received in corresponding European Application No. 16817515.6 dated Jan. 24, 2019.
(Continued)

*Primary Examiner* — Shanto Abedin
(74) *Attorney, Agent, or Firm* — Mattingly & Malur, PC

(57) ABSTRACT

An in-vehicle information communication system is configured from an in-vehicle communication device, an electronic control device that is installed in a vehicle, and an information processing device that is not installed in a vehicle. The electronic control device comprises an electronic control device storage unit, a message generation unit, a MAC generation unit, and an electronic control device communication unit which sends the message and the MAC to the information processing device via the in-vehicle communication device. The information processing device comprises an information processing device storage unit, a message authentication code verification unit, a response code generation unit, and an information processing device communication unit which sends the response code to the electronic control device via the in-vehicle communication
(Continued)

device. The electronic control device further comprises a response code verification unit.

4 Claims, 15 Drawing Sheets

(51) Int. Cl.
| | |
|---|---|
| *G06F 21/44* | (2013.01) |
| *H04L 9/08* | (2006.01) |
| *H04W 12/06* | (2009.01) |
| *H04W 12/10* | (2009.01) |
| *H04W 12/00* | (2009.01) |
| *H04W 4/48* | (2018.01) |
| *G06F 7/58* | (2006.01) |
| *G06F 8/65* | (2018.01) |

(52) U.S. Cl.
CPC .............. *H04L 9/0897* (2013.01); *H04L 9/32* (2013.01); *H04L 63/0435* (2013.01); *H04L 63/123* (2013.01); *H04W 12/06* (2013.01); *G06F 7/588* (2013.01); *G06F 8/65* (2013.01); *H04L 2209/80* (2013.01); *H04L 2209/84* (2013.01); *H04W 4/48* (2018.02); *H04W 12/0023* (2019.01); *H04W 12/1006* (2019.01)

(56) References Cited

U.S. PATENT DOCUMENTS

| | | | | |
|---|---|---|---|---|
| 2009/0119657 A1* | 5/2009 | Link, II | .................... | G06F 8/64 717/171 |
| 2011/0083161 A1 | 4/2011 | Ishida et al. | | |
| 2013/0179689 A1* | 7/2013 | Matsumoto | ............... | G06F 8/61 713/171 |
| 2014/0114497 A1* | 4/2014 | Miyake | ..................... | H04L 9/32 701/1 |
| 2015/0180840 A1 | 6/2015 | Jung et al. | | |
| 2015/0270968 A1* | 9/2015 | Naim | ........................ | H04L 9/32 713/181 |
| 2016/0112201 A1* | 4/2016 | Misawa | ................ | H04W 12/06 713/168 |

FOREIGN PATENT DOCUMENTS

| | | |
|---|---|---|
| WO | 2009/147734 A1 | 12/2009 |
| WO | 2013/005730 A1 | 1/2013 |

OTHER PUBLICATIONS

Muhammad Sabir Idrees, et al., "Secure Automotive On-Board Protocols: A Case of Over-the-Air Firmware Updates", Online, Mar. 2011, <URL: http://www.eurocom.fr/publication/3364> Especially 4 secure Firmware Updated Protocol.

K. Han, et al., "Secure Automotive On-Board Protocols: A Case of Over-The-Air Firmware Updates", IEEE/ACM Fourth International Conference on Cyber-Physical Systems, 2013, pp. 160-169.

2013 IEEE/ACM Fourth International Conference on Cyber-Physical Systems, ICCPS 2013.

International Search Report of PCT/JP2016/057939 dated Jun. 14, 2016.

* cited by examiner

FIG.2

| VEHICLE ID | IN-VEHICLE COMMUNICATION DEVICE ID | ECU ID | ECU MANUFACTURER ID | FIRMWARE VERSION INFORMATION | ECU SECRET INFORMATION ID | IN-VEHICLE COMMUNICATION DEVICE SECRET INFORMATION ID |
|---|---|---|---|---|---|---|
| ... | ... | ... | ... | ... | ... | ... |
| ... | ... | ... | ... | ... | ... | ... |

TRANSMISSION/RECEPTION TABLE 117

FIG.4

| VEHICLE ID | INFORMATION PROCESSING DEVICE ID | ECU ID | ECU MANUFACTURER ID | FIRMWARE VERSION INFORMATION | INFORMATION PROCESSING DEVICE SECRET INFORMATION ID |
|---|---|---|---|---|---|
| ... | ... | ... | ... | ... | ... |
| ... | ... | ... | ... | ... | ... |

INFORMATION MANAGEMENT TABLE ~158

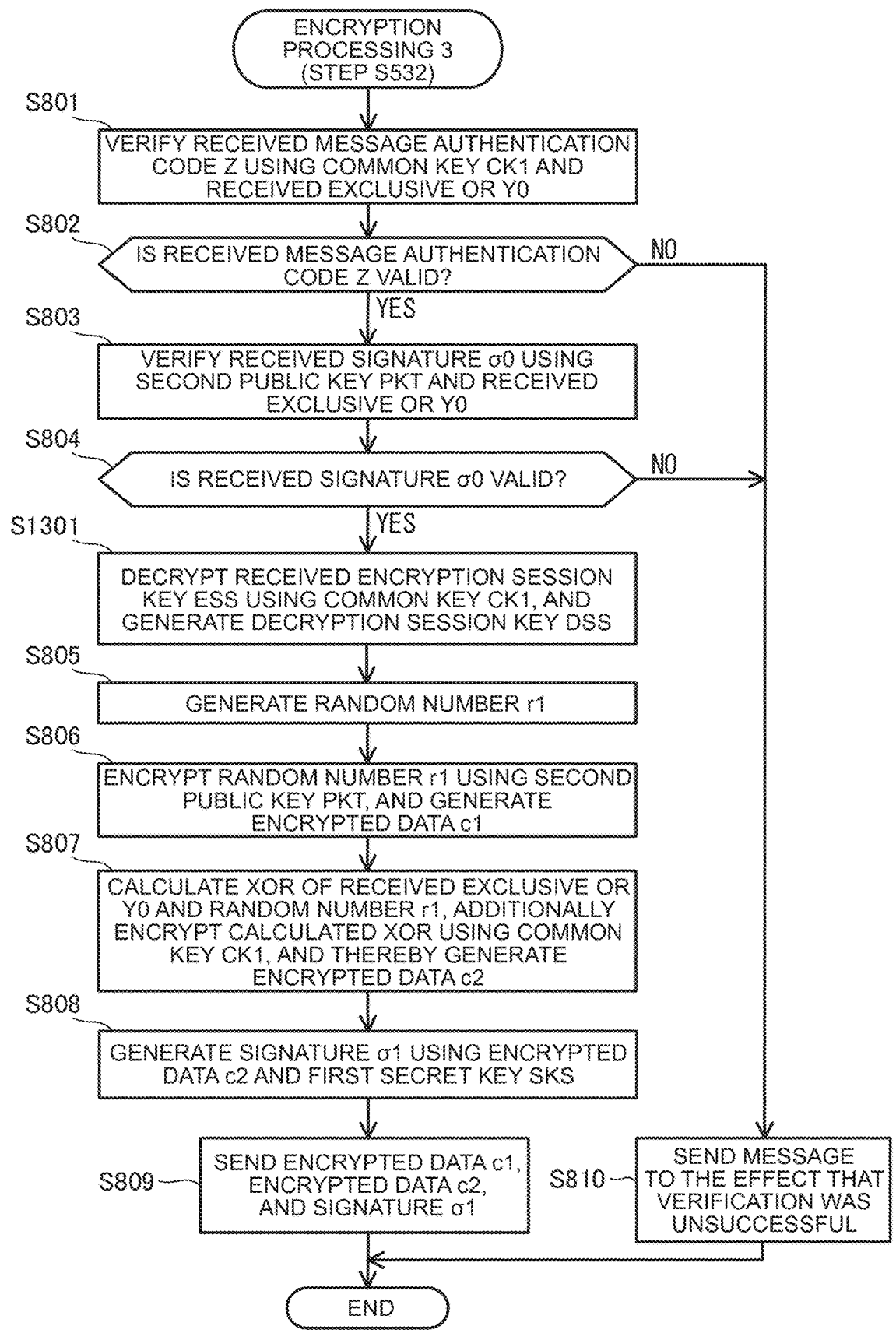

IN-VEHICLE INFORMATION COMMUNICATION SYSTEM AND AUTHENTICATION METHOD

TECHNICAL FIELD

The present invention relates to an in-vehicle information communication system and an authentication method.

BACKGROUND ART

Pursuant to the networking of in-vehicle equipment and the increase of in-vehicle software, the necessity of introducing information security technologies is also being recognized in the automobile sector. In particular, the service of distributing and updating the firmware of ECUs (Electric Control Units) from an external information processing device via wireless transmission is now being put into practical application, and the necessity of introducing security technologies for the foregoing firmware update is increasing.

PTL 1 discloses an invention in which, in a communication system configured from an ECU, a center, and a rewriting device existing on a communication path connecting the ECU and the center, when the center authenticates the rewriting device, the center sends, to the rewriting device, secret information required for rewriting the firmware of the ECU.

CITATION LIST

Patent Literature

[PTL 1] Japanese Patent Application Publication No. 2004-348767

SUMMARY OF THE INVENTION

Problems to be Solved by the Invention

With the invention described in PTL 1, the secret information related to the ECU is sent from the server to the rewriting device, and it is not possible to secure the confidentiality of the secret information related to the ECU.

Means to Solve the Problems

According to the first mode of the present invention, provided is an in-vehicle information communication system configured from an in-vehicle communication device and an electronic control device which are installed in a vehicle, and an information processing device which is not installed in a vehicle, wherein the electronic control device comprises: an electronic control device storage unit which stores a common key that is shared with the information processing device in advance; a message generation unit which generates a message for use in authentication; a message authentication code generation unit which uses the common key and generates a message authentication code related to the message; and an electronic control device communication unit which sends the message generated by the message generation unit and the message authentication code generated by the message authentication code generation unit to the information processing device via the in-vehicle communication device, wherein the information processing device comprises: an information processing device storage unit which stores the common key; a message authentication code verification unit which performs authentication of the electronic control device by verifying the received message authentication code using the common key and the received message; a response code generation unit which generates a response code by encrypting a value based on the received message via symmetric key encryption with the common key and an information processing device communication unit which, when the verification by the message authentication code verification unit is successful, sends the response code generated by the response code generation unit to the electronic control device via the in-vehicle communication device, and wherein the electronic control device further comprises: a response code verification unit which performs authentication of the information processing by verifying the received response code based on the common key.

According to the second mode of the present invention, provided is an authentication method, in an in-vehicle information communication system configured from an in-vehicle communication device and an electronic control device which are installed in a vehicle, and an information processing device which is not installed in a vehicle, of the electronic control device and the information processing device, wherein the electronic control device: generates a message for use in authentication; uses a common key that is shared with the information processing device in advance and generates a message authentication code related to the message; and sends the generated message and the generated message authentication code to the information processing device via the in-vehicle communication device, wherein the information processing device: authenticates the electronic control device by verifying the received message authentication code using the common key and the received message; generates a response code based on the received message and the common key and, when the verification is successful, sends the generated response code to the electronic control device via the in-vehicle communication device, and wherein the electronic control device authenticates the information processing device by verifying the received response code based on the common key.

Advantageous Effects of the Invention

According to the present invention, it is possible to secure the confidentiality of the secret information related to the ECU.

BRIEF DESCRIPTION OF DRAWINGS

FIG. 2 is a diagram showing an example of the transmission/reception table 117.

FIG. 4 is a diagram showing an example of the information management table 158.

FIG. 15 is a flowchart showing the details of the encryption processing 3 in the second embodiment.

DESCRIPTION OF EMBODIMENTS

First Embodiment

An embodiment of the in-vehicle information communication system according to the present invention is now explained with reference to FIG. 1 to FIG. 12.

Figure 1:
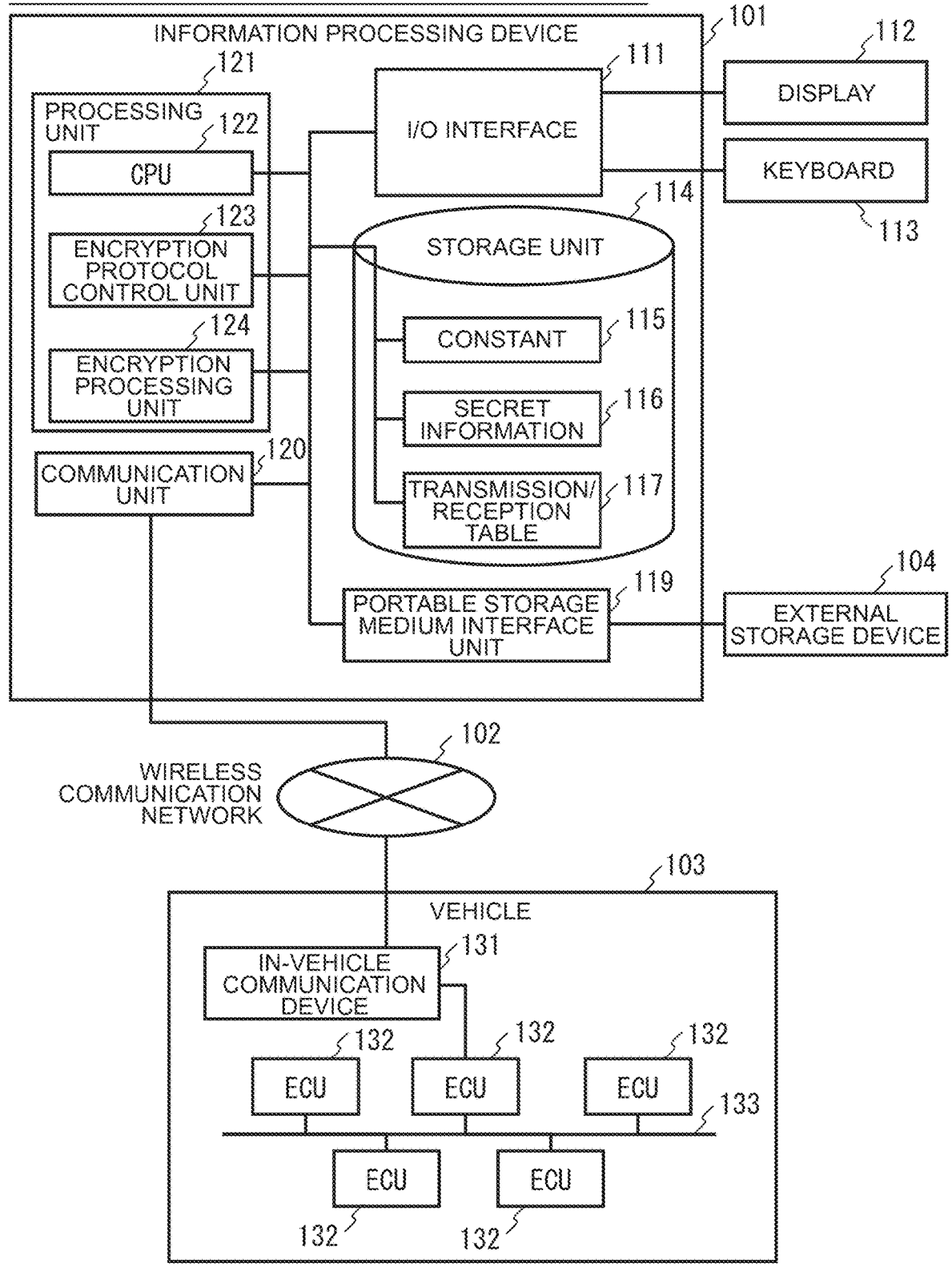
FIG. 1 is a diagram showing a schematic configuration of the in-vehicle information communication system 1 in the first embodiment.

FIG. 1 is a diagram showing a schematic configuration of the in-vehicle information communication system 1 in the first embodiment of the present invention. As shown in FIG. 1, the in-vehicle information communication system 1 includes an information processing device 101, and a vehicle 103. The information processing device 101 and the vehicle 103 are communicably connected to each other via a wireless communication network 102. In FIG. 1, while the in-vehicle information communication system 1 is configured from one information processing device 101 and one vehicle 103, the in-vehicle information communication system 1 may also be configured from a plurality of information processing devices 101 and a plurality of vehicles 103.

The vehicle 103 is configured from an in-vehicle communication device 131, and a plurality of ECUs 132. The in-vehicle communication device 131 and the plurality of ECUs 132 are communicably connected to each other via an in-vehicle network 133. Only the in-vehicle communication device 131 is connected to the wireless communication network 102, and none of the ECUs 132 can communicate with the information processing device 101 without going through the in-vehicle communication device 131.

(Configuration of Information Processing Device 101)

The information processing device 101 is, for example, a server device. As shown in FIG. 1, the information processing device 101 comprises an I/O interface 111, a storage unit 114, a portable storage medium interface unit 119, a communication unit 120, and a processing unit 121. The I/O interface 111, the storage unit 114, the portable storage medium interface unit 119, the communication unit 120, and the processing unit 121 are communicably connected to each other via a bus 118. The storage unit 114 stores a constant 115, key information 116, and a transmission/reception table 117. The processing unit 121 comprises an encryption protocol control unit 123, and an encryption processing unit 124.

The I/O interface 111 performs interface processing of signals to be input and output between the processing unit 121 and a display 112, and a keyboard 113. The processing unit 121 displays various types of information by outputting signals to the display 112 via the I/O interface 111. The processing unit 121 can acquire operation signals output from the keyboard 113 via the I/O interface 111, detect the operator's operation performed to the information processing device 101, and perform processing according to the detected operation.

The storage unit 114 is configured, for example, from a ROM, a RAM, a NVRAM (Non Volatile RAM), a hard disk device, a SSD (Solid State Drive), or an optical storage device. The storage unit 114 stores a constant 115, key information 116, and a transmission/reception table 117.

The constant 115 is a constant or the like used in encryption processing, and may be, for example, a base point in elliptic curve encryption, or a public key encryption exponent e in RSA encryption.

The key information 116 is information of a plurality of keys to be used in authentication. The term "key" as used herein refers to predetermined electronic data, and is, for example, and an extremely large number. The types, characteristics, and functions of a key will be described later. As the key information 116, keys corresponding to the respective communication destinations are prepared, and the correspondence of the communication destination and the key is recorded in the transmission/reception table 117. The transmission/reception table 117 stores identification information for identifying the in-vehicle communication device 131 and the ECU 132, and identification information of the key information 116 corresponding to the individual in-vehicle communication devices 131 and ECUs 132.

FIG. 2 is a diagram showing an example of the transmission/reception table 117. The transmission/reception table 117 is configured from a vehicle ID for identifying the vehicle 103, an in-vehicle communication device ID for identifying the in-vehicle communication device 131, an ECU ID for identifying the ECU 132, an ECU manufacturer ID for identifying the ECU manufacturer that manufactured the ECU 132, firmware version information for identifying the version information of the firmware of the ECU 132, an ECU key information ID for identifying the key information to be used in the authentication of the ECU 132, and an in-vehicle communication device secret information ID for identifying the key information to be used in the authentication of the in-vehicle communication device 131.

Explanation is now continued by returning to FIG. 1.

The portable storage medium interface unit 119 is an interface device for connecting a portable storage medium to the information processing device 101. The processing unit 121 reads and writes data from and to the USB memory and the various types of memory cards connected via the portable storage medium interface unit 119.

The communication unit 120 communicates with the vehicle 103 via the wireless communication network 102.

The wireless communication network 102 is, for example, a mobile phone network or a wireless LAN.

(Processing Unit 121)

The processing unit 121 is configured from a CPU, a ROM, and a RAM. The CPU executes the programs stored in the ROM by reading the programs into the RAM. However, the processing unit 121 may also be configured from an MPU in substitute for the CPU, or an MPU may be used together with the CPU.

The encryption protocol control unit 123 and the encryption processing unit 124 represent the functions of the programs stored in the ROM as functional blocks.

The encryption protocol control unit 123 controls the authentication processing described later. The encryption processing unit 124 performs the various types of encryption processing used in the authentication processing.

(Configuration of in-Vehicle Communication Device 131)

Figure 3:
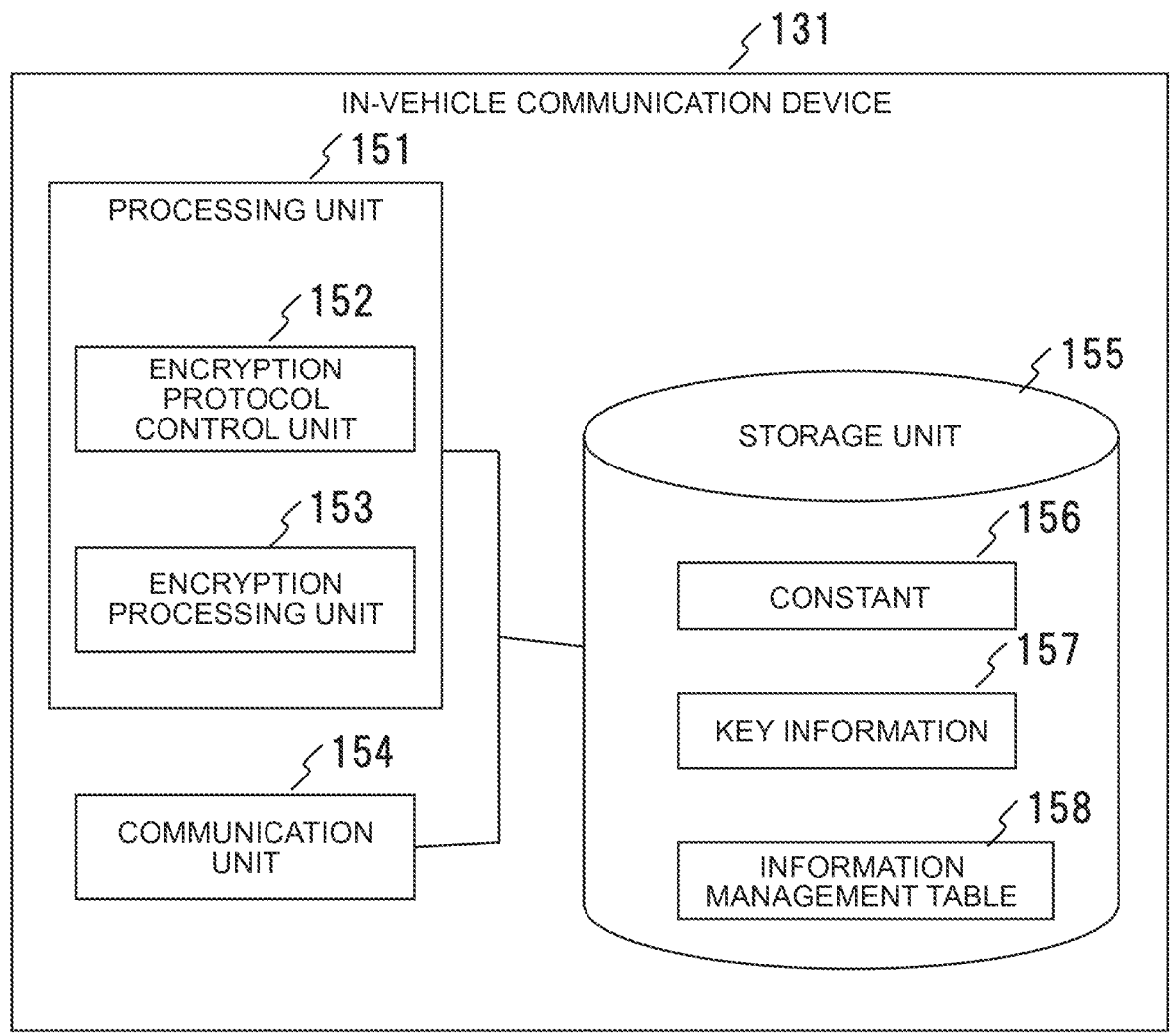
FIG. 3 is a block diagram showing a configuration of the in-vehicle communication device 131.

FIG. 3 is a block diagram showing a configuration of the in-vehicle communication device 131.

The in-vehicle communication device 131 comprises a processing unit 151, a communication unit 154, and a storage unit 155.

The processing unit 151 is configured from a CPU, a ROM, and a RAM. The CPU executes the programs stored in the ROM by reading the programs into the RAM. However, the processing unit 151 may also be configured from an MPU (Micro Processing Unit) in substitute for the CPU, or an MPU may be used together with the CPU.

The encryption protocol control unit 152 and the encryption processing unit 153 represent the functions of the programs stored in the ROM as functional blocks.

The encryption protocol control unit 152 controls the authentication processing described later. The encryption processing unit 153 performs the various types of encryption processing used in the authentication processing.

The communication unit 154 communicates with the information processing device 101 via the wireless communication network 102, and communicates with the ECU 132 via the in-vehicle network 133.

The storage unit 155 is configured, for example, from a ROM (Read Only Memory), a RAM (Random Access Memory), a NVRAM (Non Volatile RAM), a hard disk device, a SSD, or an optical storage device. The storage unit 155 stores a constant 156, key information 157, and an information management table 158.

The constant 156 is a constant or the like used in encryption processing, and may be, for example, a base point in elliptic curve encryption, or a public key encryption exponent e in RSA encryption.

The key information 157 is information of a plurality of keys to be used in authentication. The types and functions of a key will be described later. As the key information 157, keys corresponding to the respective communication destinations are prepared, and the correspondence of the communication destination and the key is recorded in the transmission/reception table 158. The information management table 158 stores identification information for identifying the information processing device 101, and identification information of the key information 157 corresponding to the individual information processing devices 101.

FIG. 4 is a diagram showing an example of the information management table 158.

The information management table 158 is used by the in-vehicle communication device 131 for identifying the ECU 132 connected to the in-vehicle network in the vehicle 103 and managing the firmware version information of the ECU 132.

The information management table 158 is configured from a vehicle ID for identifying the vehicle 103, an information processing device ID for identifying the information processing device 101 of the communication destination, an ECU ID for identifying the ECU 132, an ECU manufacturer ID for identifying the ECU manufacturer that manufactured the ECU 132, firmware version information for identifying the version information of the firmware of the ECU 132, and information processing device secret information ID for identifying the key information 157 to be used in the authentication of the information processing device 101.

(Configuration of ECU 132)

Figure 5:
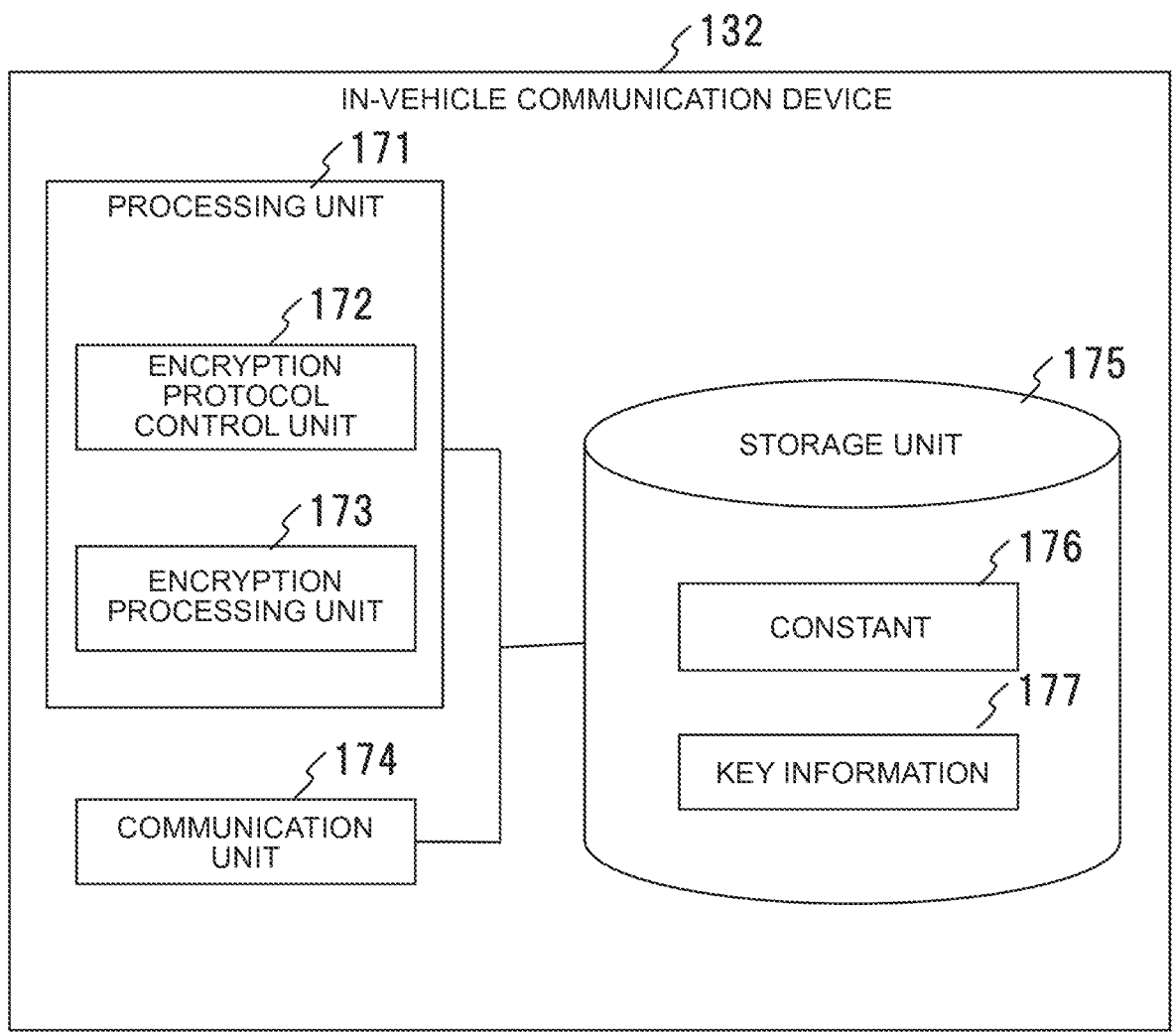
FIG. 5 is a block diagram showing a configuration of the ECU 132.

FIG. 5 is a block diagram showing a configuration of the ECU 132.

The ECU 132 comprises a processing unit 171, a communication unit 174, and a storage unit 175.

The processing unit 171 is configured from a CPU, a ROM, and a RAM. The CPU executes the programs stored in the ROM by reading the programs into the RAM. However, the processing unit 171 may also be configured from an MPU (Micro Processing Unit) in substitute for the CPU, or an MPU may be used together with the CPU.

The encryption protocol control unit 172 and the encryption processing unit 173 represent the functions of the programs stored in the ROM as functional blocks.

The encryption protocol control unit 172 controls the authentication processing described later. The encryption processing unit 173 performs the various types of encryption processing used in the authentication processing. The encryption protocol control unit 172 starts the processing described later when an ignition key (not shown) of the vehicle 103 is turned ON by the user.

The communication unit 174 communicates with the in-vehicle communication device 131 via the in-vehicle network 133.

The storage unit 175 is configured, for example, from a ROM, a RAM, a NVRAM, a hard disk device, a SSD, or an optical storage device. The storage unit 175 stores a constant 176, and key information 177.

The constant 176 is a constant or the like used in encryption processing, and may be, for example, a base point in elliptic curve encryption, or a public key encryption exponent e in RSA encryption.

The key information 177 is information of a plurality of keys to be used in authentication with a specific information processing device 101. The types and functions of a key will be described later. Because the ECU 132 communicates with only a specific information processing device 101, the ECU 132 does not have keys corresponding to a plurality of communication destinations as with the information processing device 101 and the in-vehicle communication device 131. Thus, the ECU 132 also does not have information corresponding to the transmission/reception table 117 and the information management table 158.

(Key Information)

The key information 116 stored in the information processing device 101, the key information 157 stored in the in-vehicle communication device 131, and the key information 177 stored in the ECU 132 are now explained with reference to FIG. 6. However, FIG. 6 only shows the key information to be used in the authentication of a certain set of the information processing device 101, the in-vehicle communication device 131, and the ECU 132. Keys indicated at the same height in the vertical direction of FIG. 6 are the same keys or keys that are correlated.

Figure 6:
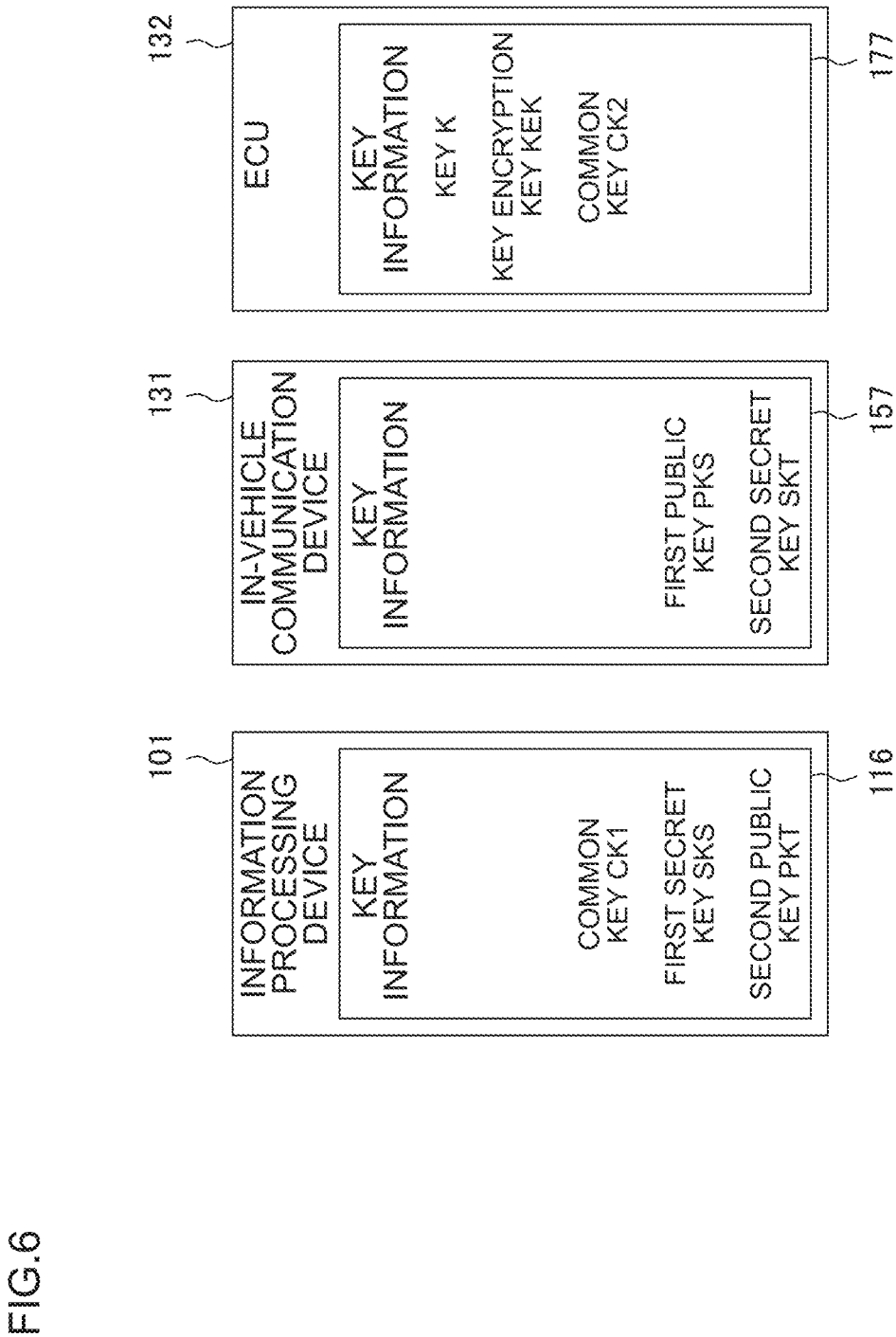
FIG. 6 is a diagram showing a correlation of the key information stored in the information processing device 101, the in-vehicle communication device 131, and the ECU 132.

FIG. 6 is a diagram showing a correlation of the key information stored in the information processing device 101, the in-vehicle communication device 131, and the ECU 132. The information processing device 101 comprises a common key CK1, a first secret key SKS, and a second public key PKT. The in-vehicle communication device 131 comprises a first public key PKS and a second secret key SKT. The ECU 132 comprises a key K, a key encryption key KEK, and a common key CK2. The key K, the key encryption key KEK, and the common key CK2 are the secret information stored in the ECU 132. The key K is, for example, information that is required upon outputting an operation command to the ECU 132 from the outside.

The key K and the key encryption key KEK stored in the ECU 132 are keys that are only equipped in the ECU 132.

The common key CK1 stored in the information processing device 101 and the common key CK2 stored in the ECU 132 are the same, and these are so-called shared secret keys. The common key CK1 and the common key CK2 are shared by the information processing device 101 and the ECU 132 in advance based on a safe delivery method.

The first secret key SKS and the first public key PKS are a pair of keys, a so-called key pair, corresponding to the public key encryption. The second public key PKT and the second secret key SKT are similarly a pair of keys, a so-called key pair, corresponding to the public key encryption. The first secret key SKS and the second secret key SKT are so-called private keys. The first public key PKS and the second public key PKT are so-called public keys.

Authentication is mutually performed between the information processing device 101 and the ECU 132 by using the common key CK1 and the common key CK2.

Authentication is performed between the information processing device 101 and the in-vehicle communication device 131 as a result of one creating an electronic signature (hereinafter simply referred to as a "signature") by using a secret key, and the other verifying the signature by using a corresponding public key.

(Overview of Authentication Processing)

The overview of the authentication processing performed by the information processing device 101, the in-vehicle communication device 131, and the ECU 132 is now explained.

Figure 7:
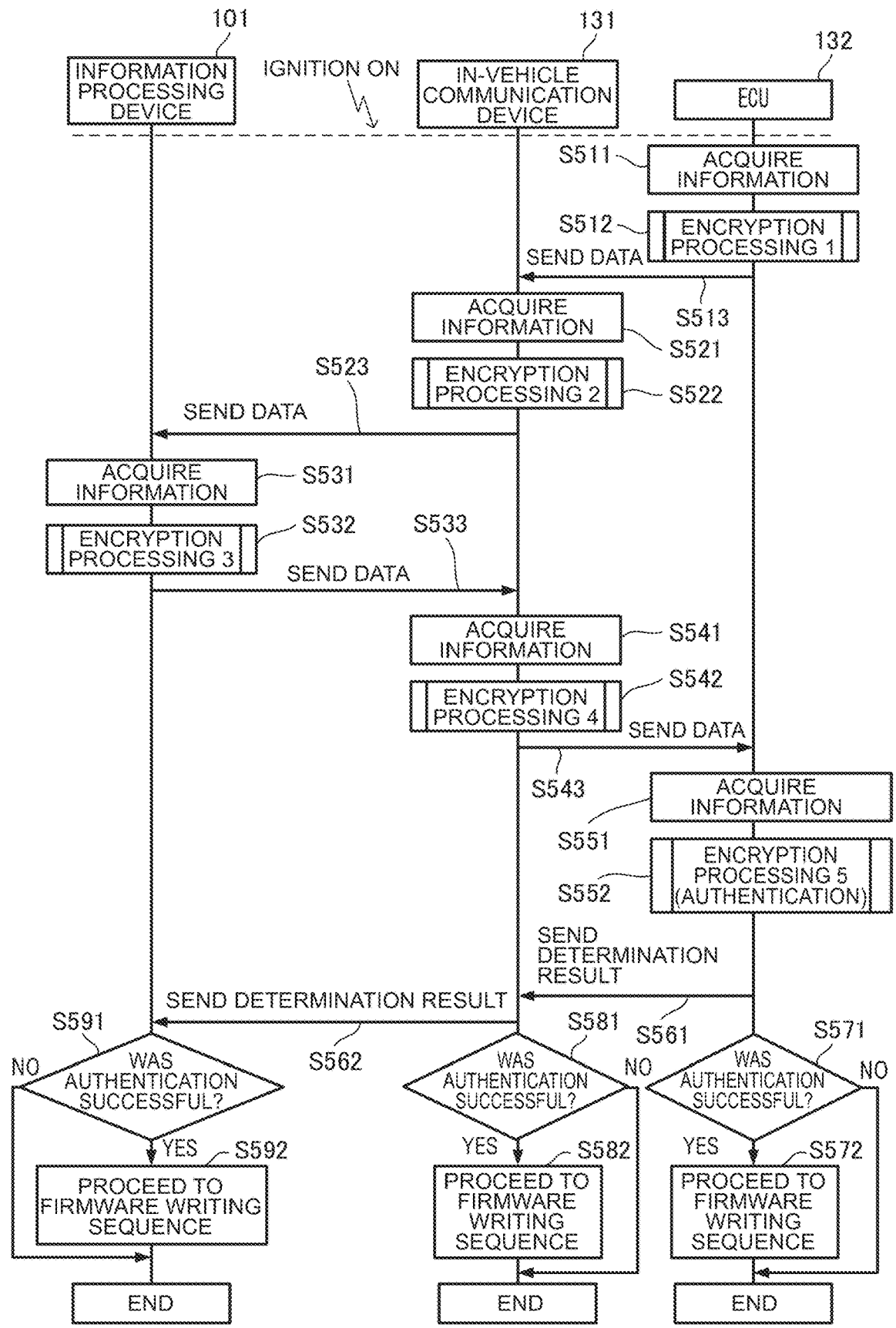
FIG. 7 is a transition diagram showing the authentication processing flow.

FIG. 7 is a transition diagram showing the overview of the authentication processing. Time is elapsing from top to bottom in FIG. 7.

The processing unit 171 of the ECU 132 reads the key information 177 from the storage unit 175 when the ignition switch of the vehicle 103 is turned ON (step S511). The processing unit 171 of the ECU 132 implements the encryption processing 1 by using the key information 177 acquired in step S511 (step S512). The encryption processing 1 of step S512 is realized, for example, based on the flowchart of FIG. 8 described later. The communication unit 174 of the ECU 132 sends the information generated in step S512 to the in-vehicle communication device 131 installed in the same vehicle 103 (step S513).

When the in-vehicle communication device 131 receives the data sent in step S513, the processing unit 151 of the in-vehicle communication device 131 reads the key information 157 from the storage unit 155 (step S521).

The processing unit 151 of the in-vehicle communication device 131 implements the encryption processing 2 by using the data received in step S513, and the key information 157 acquired in step S521 (step S522). The encryption processing 2 of step S522 is realized, for example, based on the flowchart of FIG. 9 described later.

The communication unit 154 of the in-vehicle communication device 131 sends the information generated in step S522 to the information processing device 101 via the wireless communication network 102 (step S523).

When the information processing device 101 receives the data sent in step S523, the processing unit 121 of the information processing device 101 reads the key information 116 stored in the storage unit 114 (step S531).

The processing unit 121 of the information processing device 101 implements the encryption processing 3 by using the received data and the key information 116 acquired in step S531 (step S532). The encryption processing 3 of step S532 is realized, for example, based on the flowchart of FIG. 10 described later. In the encryption processing 3, authentication of the in-vehicle communication device 131 and the ECU 132 by the information processing device 101 is performed.

The communication unit 120 of the information processing device 101 sends the data generated in step S532 to the in-vehicle communication device 131 (step S533). When the in-vehicle communication device 131 receives the data sent in step S533, the processing unit 151 of the in-vehicle communication device 131 reads the key information 157 from the storage unit 155 (step S541). The processing unit 151 implements the encryption processing 4 by using the key information 157 acquired in step S541, and the received data (step S542). The encryption processing 4 of step S542 is realized, for example, based on the flowchart of FIG. 11 described later. In the encryption processing 4, authentication of the information processing device 101 by the in-vehicle communication device 131 is performed.

The communication unit 154 of the in-vehicle communication device 131 sends the data including the information generated in step S542 to the ECU 132 (step S543).

When the ECU 132 receives the data sent in step S543, the processing unit 171 of the ECU 132 reads the key information 177 from the storage unit 175 (step S551). The processing unit 171 of the ECU 132 implements the encryption processing 5 by using the information acquired in step S551 (step S552). The encryption processing 5 of step S552 is realized, for example, based on the flowchart of FIG. 12 described later. In the encryption processing 5, authentication of the information processing device 101 and the in-vehicle communication device 131 by the ECU 132 is performed.

The communication unit 174 of the ECU 132 sends the authentication result in step S552 to the in-vehicle communication device 131 (step S561).

When the in-vehicle communication device 131 receives the determination result sent in step S561, the processing unit 151 of the in-vehicle communication device 131 stores the determination result in the storage unit 155. The communication unit 154 sends the received determination result to the information processing device 101 (step S562).

When the information processing device 101 receives the determination result sent in step S562, the processing unit 121 of the information processing device 101 stores the determination result in the storage unit 114.

Upon completing the execution of step S561, the processing unit 171 of the ECU 132 reads the authentication determination result stored in the storage unit 175, and determines whether or not the authentication was successful. The processing unit 171 of the ECU 132 proceeds to step S572 upon determining that the authentication was successful, and ends the processing upon determining that the authentication was unsuccessful (step S571). The processing unit 171 of the ECU 132 proceeds to the firmware writing sequence upon determining that the authentication was successful in step S571 (step S572).

Upon completing the execution of step S562, the processing unit 151 of the in-vehicle communication device 131 reads the authentication determination result stored in the storage unit 155, and determines whether or not the authentication was successful. The processing unit 151 of the in-vehicle communication device 131 proceeds to step S582 upon determining that the authentication was successful, and ends the processing upon determining that the authentication was unsuccessful (step S581). The processing unit 151 of the in-vehicle communication device 131 proceeds to the firmware writing sequence upon determining that the authentication was successful in step S581 (step S582).

The processing unit 121 of the information processing device 101 determines whether or not the authentication was successful with the reception of the determination result in step S562 as the trigger. The processing unit 121 of the information processing device 101 proceeds to step S592 upon determining that the authentication was successful, and ends the processing upon determining that the authentication was unsuccessful (step S591).

The processing unit 121 of the information processing device 101 proceeds to the firmware writing sequence upon determining that the authentication was successful in step S591 (step S592).

In the firmware writing sequence of step S572, step S582, and step S592, the information processing device 101, the in-vehicle communication device 131, and the ECU 132 perform the firmware update processing while communicating with each other. In the firmware update processing, additional encryption/decryption processing of the firmware, generation of a signature, generation of a message authentication code (hereinafter sometimes indicated as "MAC"), verification of the signature and the MAC, and other security functions may also be implemented, and there is no limitation in the method thereof.

(Details of Encryption Processing)

Details of the encryption processing 1 to 5 shown in FIG. 7 are now explained with reference to FIG. 8 to FIG. 12.

(Flowchart of Encryption Processing 1)

Figure 8:
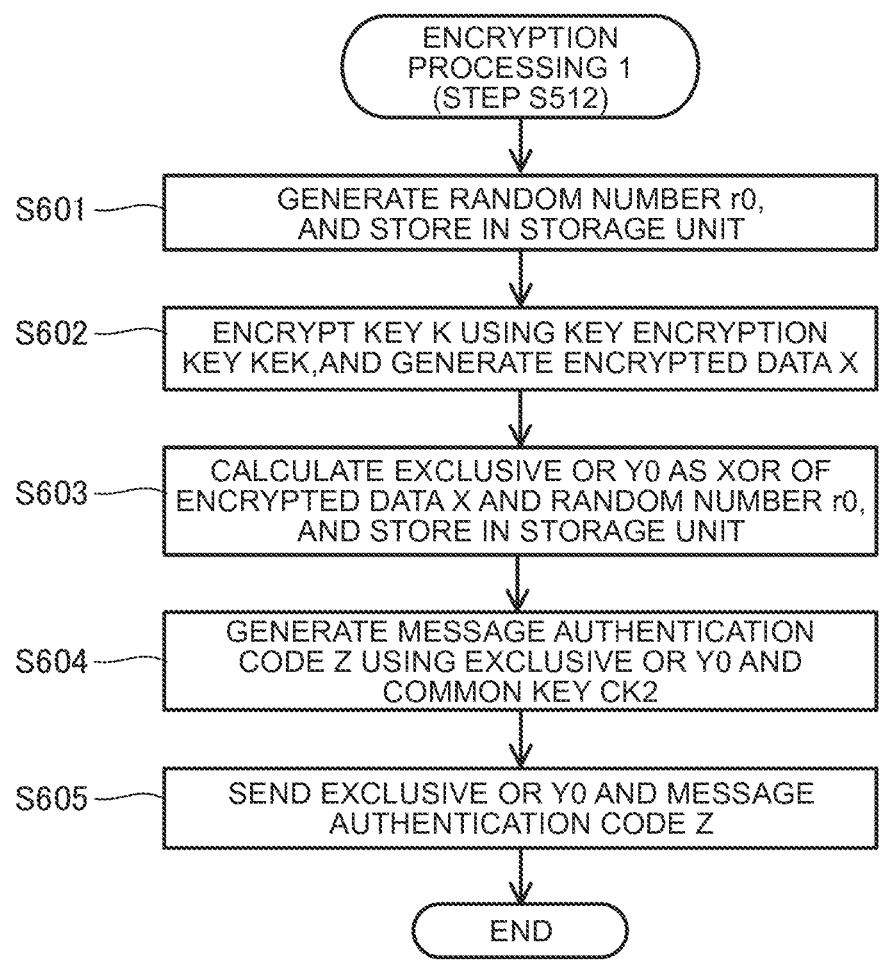
FIG. 8 is a flowchart showing the details of the encryption processing 1 performed by the ECU.

FIG. 8 is a flowchart showing a specific example of the encryption processing 1 illustrated as step S512 in FIG. 7. The executing subject of each step explained below is the encryption protocol control unit 172 of the ECU 132. The encryption protocol control unit 172 starts the following processing when the ignition switch of the vehicle 103 is turned ON.

In step S601, the encryption protocol control unit 172 causes the encryption processing unit 173 to generate a random number r0, and stores the generated random number r0 in the storage unit 175. The encryption protocol control unit 172 then proceeds to step S602.

In step S602, the encryption protocol control unit 172 causes the encryption processing unit 173 to encrypt the key K by using the key encryption key KEK. The key K and the key encryption key KEK used in this step are the information stored in the storage unit 175 as the key information 177. The data generated by the encryption processing unit 173 in this step is hereinafter referred to as the encrypted data X.

Here, when the generation of the encrypted text is expressed with the format of "encrypted text=$ENC_{encryption\ key}$(plain text)", the processing of this step can be expressed with Formula 1 below.

$$X = Enc_{KEK}(K) \quad \text{(Formula 1)}$$

The encryption protocol control unit 172 then proceeds to step S603.

In step S603, the encryption protocol control unit 172 causes the encryption processing unit 173 to calculate the exclusive OR of the encrypted data X generated in step S602 and the random number r0 generated in step S601, and stores the calculated exclusive OR as the exclusive OR Y0 in the storage unit 175. Here, when the operator of the exclusive OR (hereinafter sometimes indicated as "XOR") is expressed using a symbol in which a cross shape is indicated in a circle, the processing of this step can be expressed with Formula 2 below.

[Math 1]

$$Y0 = X \oplus r0 \quad \text{(Formula 2)}$$

The encryption protocol control unit 172 then proceeds to step S604.

In step S604, the encryption protocol control unit 172 generates a message authentication code Z with the exclusive OR Y0 generated in step S603 as the message, and the common key CK2 as the key. Here, when the generation of the message authentication code is expressed with the format of "message authentication code=$MAC_{key}$(message)", the processing of this step can be expressed with Formula 3 below.

$$Z = MAC_{CK2}(Y0) \quad \text{(Formula 3)}$$

The encryption protocol control unit 172 then proceeds to step S605.

In step S605, the encryption protocol control unit 172 sends the exclusive OR Y0 generated in step 603 and the message authentication code Z generated in step 604 to the in-vehicle communication device 131 by using the communication unit 174. The encryption processing 1 depicted in FIG. 8 is thereby ended.

(Flowchart of Encryption Processing 2)

Figure 9:
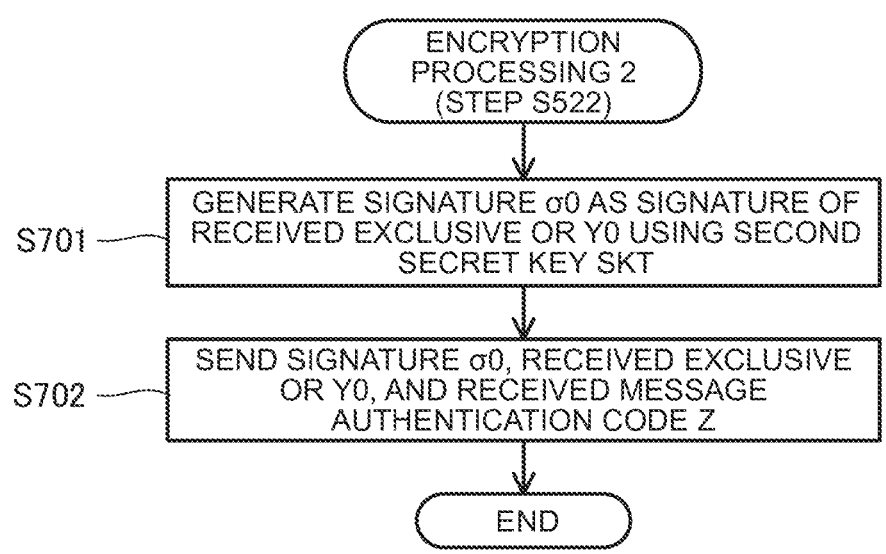
FIG. 9 is a flowchart showing the details of the encryption processing 2 performed by the in-vehicle communication device.

FIG. 9 is a flowchart showing a specific example of the encryption processing 2 illustrated as step S522 in FIG. 7. The executing subject of each step explained below is the encryption protocol control unit 152 of the in-vehicle communication device 131. The encryption protocol control unit 152 starts the following processing upon receiving the exclusive OR Y0 and the message authentication code Z from the ECU 132.

In step S701, the encryption protocol control unit 152 causes the encryption processing unit 153 to execute the following processing. In other words, the encryption protocol control unit 152 causes the encryption processing unit 153 to use the second secret key SKT stored as the key information 157 and generate a signature σ0 as the signature of the received exclusive OR Y0. The encryption protocol control unit 152 then proceeds to step S702.

In step S702, the encryption protocol control unit 152 sends the signature σ0 generated in step S701, the received exclusive OR Y0, and the received message authentication code Z to the information processing device 101 by using the communication unit 154. The encryption processing 2 depicted in FIG. 9 is thereby ended.

(Flowchart of Encryption Processing 3)

Figure 10:
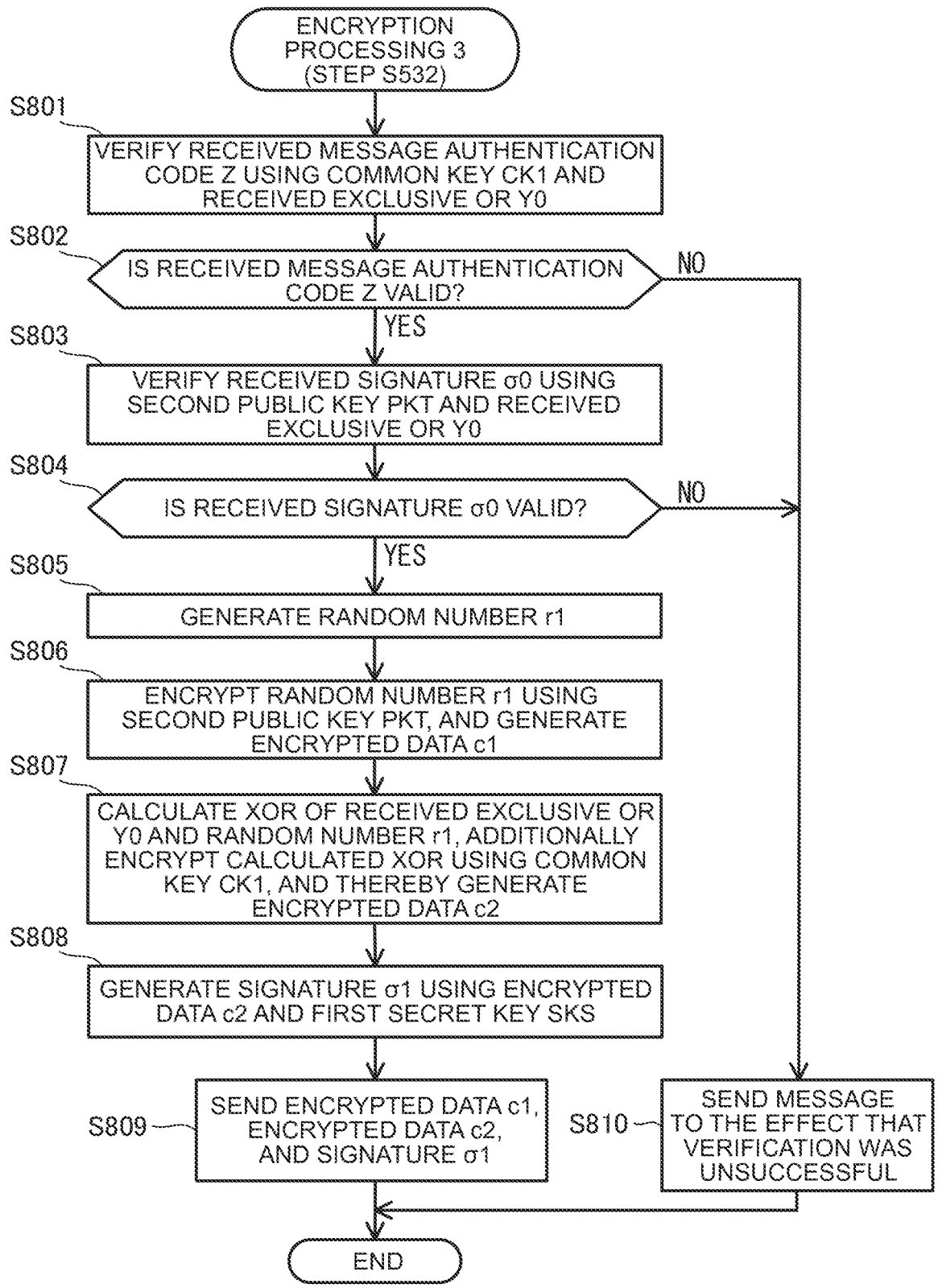
FIG. 10 is a flowchart showing the details of the encryption processing 3 performed by the information processing device.

FIG. 10 is a flowchart showing a specific example of the encryption processing 3 illustrated as step S532 in FIG. 7. The executing subject of each step explained below is the encryption protocol control unit 123 of the information processing device 101. The encryption protocol control unit 123 starts the following processing upon receiving the signature σ0, the exclusive OR Y0, and the message authentication code Z from the in-vehicle communication device 131.

In step S801, the encryption protocol control unit 123 causes the encryption processing unit 124 to execute the following processing. In other words, the encryption protocol control unit 123 causes the encryption processing unit 124 to verify the received message authentication code Z by using the common key CK1 stored as the key information 116, and the received exclusive OR Y0. Specifically, the encryption protocol control unit 123 causes the encryption processing unit 124 to generate a message authentication code in the same manner as step S604 described above. The encryption protocol control unit 123 then proceeds to step S802.

In step S802, the encryption protocol control unit 123 determines whether or not the received message authentication code Z is valid. To put it differently, the encryption protocol control unit 123 determines whether or not the received message authentication code Z and the message authentication code generated in step S801 coincide. The encryption protocol control unit 123 proceeds to step S803 upon determining that the received message authentication code Z is valid; that is, upon determining that the received message authentication code Z and the message authentication code generated in step S801 coincide. The encryption protocol control unit 123 proceeds to step S810 upon determining that the received message authentication code Z is not valid; that is, upon determining that the received message authentication code Z and the message authentication code generated in step S801 do not coincide.

Based on the verification of the message authentication code Z, it is possible to confirm that the ECU 132 that generated the message authentication code Z has the same common key as the information processing device 101. In other words, the encryption protocol control unit 123 proceeds to step S803 when the information processing device 101 authenticates the ECU 132 that generated the message authentication code Z as a result of having the same common key.

In step S803, the encryption protocol control unit 123 causes the encryption processing unit 124 to execute the following processing. In other words, the encryption protocol control unit 123 causes the encryption processing unit 124 to verify the received signature σ0 by using the second public key PKT stored as the key information 116 and the received exclusive OR Y0.

In step S804, the encryption protocol control unit 123 determines whether or not the received signature σ0 is valid. The encryption protocol control unit 123 proceeds to step S805 upon determining that the received signature σ0 is valid, and proceeds to step S810 upon determining that the received signature σ0 is not valid.

Based on the verification of the signature σ0, it is possible to confirm that the in-vehicle communication device 131 that generated the signature σ0 has the second secret key SKT corresponding to the second public key PKT. In other words, the information processing device 101 authenticates the in-vehicle communication device 131 that generated the signature σ0 on grounds of having the second secret key SKT, and then proceeds to the processing of step S805.

In step S805, the encryption protocol control unit 123 causes the encryption processing unit 124 to generate a random number r1, and stores the generated random number r1 in the storage unit 114. The encryption protocol control unit 123 then proceeds to step S806.

In step S806, the encryption protocol control unit 123 causes the encryption processing unit 124 to execute the following processing. In other words, the encryption protocol control unit 123 causes the encryption processing unit 124 to generate encrypted data c1 by using the second public key PKT stored as the key information 116 and encrypting the random number r1. The processing of this step can be expressed with Formula 4 below.

$$c1 = Enc_{PKT}(r1) \quad \text{(Formula 4)}$$

The encryption protocol control unit 123 then proceeds to step S807.

In step S807, the encryption protocol control unit 123 causes the encryption processing unit 124 to execute the following processing. In other words, the encryption protocol control unit 123 causes the encryption processing unit 124 to calculate the exclusive OR of the received exclusive OR Y0 and the random number r1, and additionally generate encrypted data c2 by encrypting the calculated exclusive OR with the common key CK1. The processing of this step can be expressed with Formula 5 below.

[Math 2]

$$c2 = Enc_{CK1}(Y0 \oplus r1) \quad \text{(Formula 5)}$$

The encryption protocol control unit 123 then proceeds to step S808.

In step S808, the encryption protocol control unit 123 causes the encryption processing unit 124 to execute the following processing. In other words, the encryption protocol control unit 123 causes the encryption processing unit 124 to use the first secret key SKS stored as the key information 157 and generate a signature σ1 as the signature of c2 generated in step S808. The encryption protocol control unit 123 then proceeds to step S809.

In step S809, the encryption protocol control unit 123 sends the encrypted data c1 generated in step S806, the encrypted data c2 generated in step S807, and the signature σ1 generated in step S808 to the in-vehicle communication device 131 by using the communication unit 120. The encryption processing 3 depicted in FIG. 10 is thereby ended.

In step S810 which is executed when a negative determination is made in step S802 or step S804, the encryption protocol control unit 123 sends a message to the effect that the verification was unsuccessful to the in-vehicle communication device 131 by using the communication unit 120. The encryption processing 3 depicted in FIG. 10 is thereby ended.

(Flowchart of Encryption Processing 4)

Figure 11:
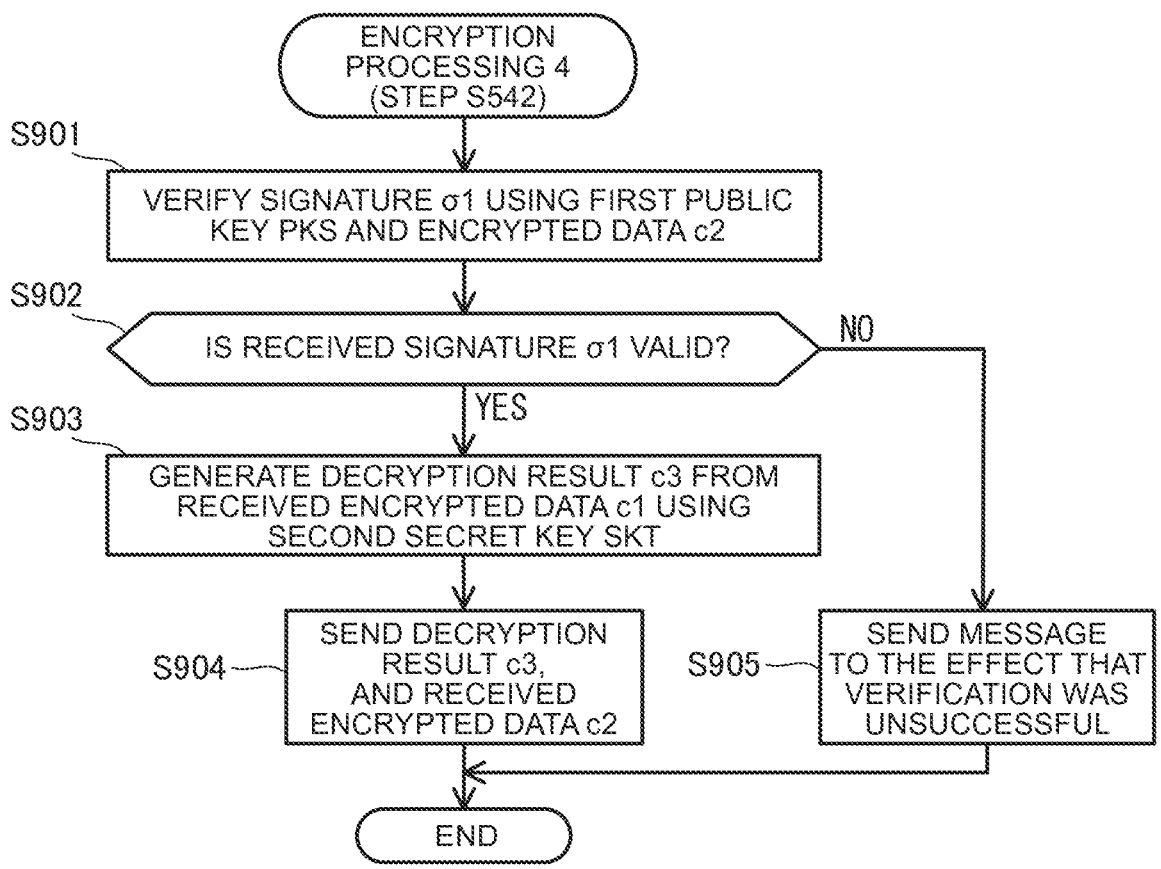
FIG. 11 is a flowchart showing the details of the encryption processing 4 performed by the in-vehicle communication device.

FIG. 11 is a flowchart showing a specific example of the encryption processing 4 illustrated as step S542 in FIG. 7. The executing subject of each step explained below is the encryption protocol control unit 152 of the in-vehicle communication device 131. The encryption protocol control unit 152 starts the following processing upon receiving the encrypted data c1, the encrypted data c2, and the signature σ1 from the information processing device 101.

In step S901, the encryption protocol control unit 152 causes the encryption processing unit 153 to execute the following processing. In other words, the encryption protocol control unit 152 causes the encryption processing unit 153 to verify the signature σ1 by using the first public key PKS stored as the key information 157, and the received encrypted data c2.

In step S902, the encryption protocol control unit 152 determines whether or not the received signature σ1 is valid. The encryption protocol control unit 152 proceeds to step S903 upon determining that the received signature σ1 is valid, and proceeds to step S905 upon determining that the received signature σ1 is not valid.

Based on the verification of the signature σ1, it is possible to confirm that the information processing device 101 that generated the signature σ1 has the first secret key SKS corresponding to the first public key PKS. In other words, the in-vehicle communication device 131 authenticates the information processing device 101 that generated the signature σ1 on grounds of having the first secret key SKS, and then proceeds to the processing of step S903.

In step S903, the encryption protocol control unit 152 causes the encryption processing unit 153 to execute the following processing. In other words, the encryption protocol control unit 152 causes the encryption processing unit 153 to use the second secret key SKT stored as the key information 157 and decrypt the received encrypted data c1, and thereby generated a decryption result c3. As explained in step 806 of FIG. 10, the encrypted data c1 is obtained by using the second public key PKT and encrypting the random number r1. Thus, so as long as the information processing device 101 and the in-vehicle communication device 131 are using the proper key, the decryption result c3 will be the random number r1. The encryption protocol control unit 152 then proceeds to step S904.

In step S904, the encryption protocol control unit 152 sends the decryption result c3 generated in step S903 and the received encrypted data c2 to the ECU 132 by using the communication unit 154. The encryption processing 4 depicted in FIG. 11 is thereby ended.

In step S905 which is executed when a negative determination is made in step S902, the encryption protocol control unit 152 sends a message to the effect that the verification was unsuccessful to the ECU 132 by using the communication unit 154. The encryption processing 4 depicted in FIG. 11 is thereby ended.

(Flowchart of Encryption Processing 5)

Figure 12:
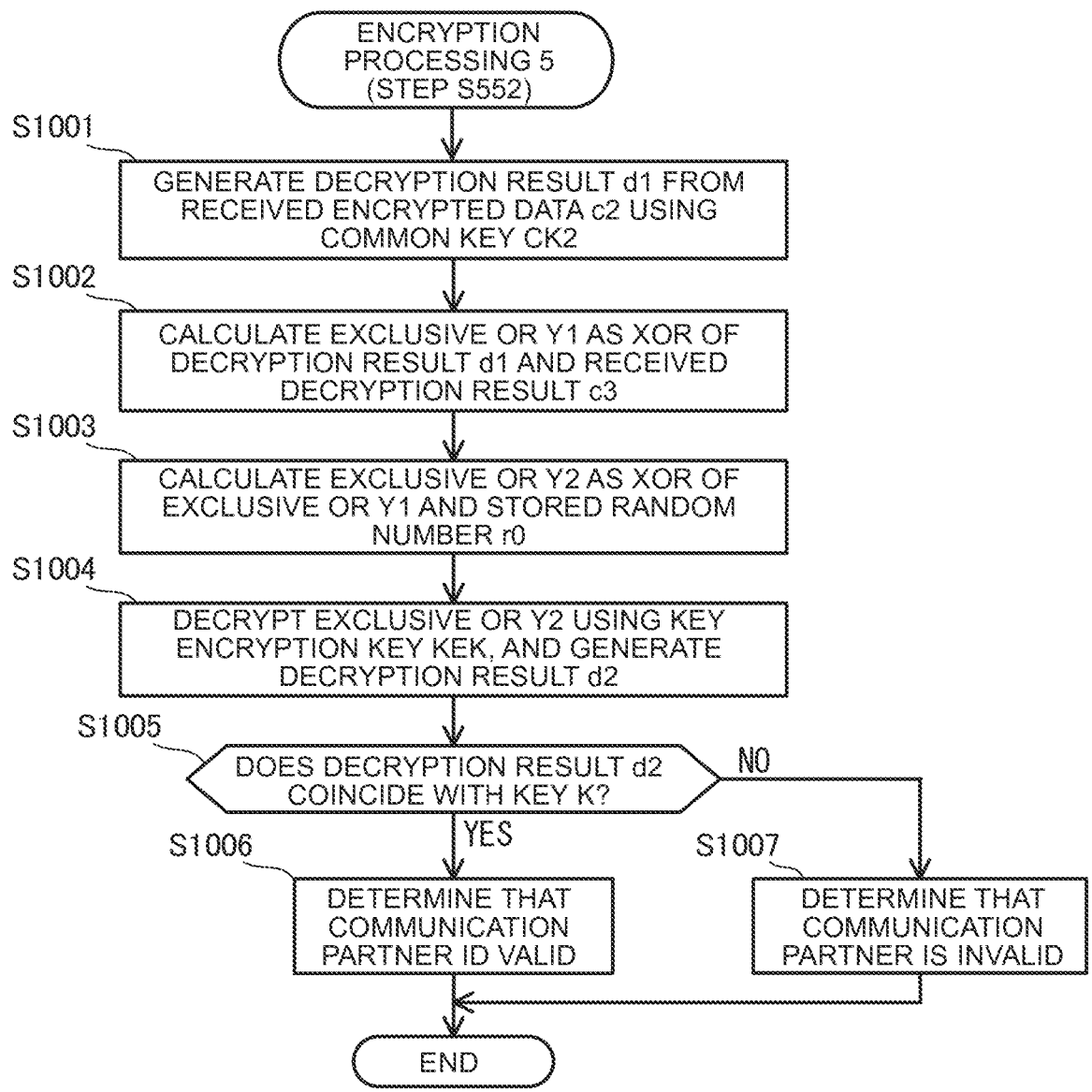
FIG. 12 is a flowchart showing the details of the encryption processing 5 performed by the ECU.

FIG. 12 is a flowchart showing a specific example of the encryption processing 5 illustrated as step S552 in FIG. 7. The executing subject of each step explained below is the encryption protocol control unit 172 of the ECU 132. The encryption protocol control unit 172 starts the following processing upon receiving the decryption result c3 and the encrypted data c2 from the in-vehicle communication device 131.

In step S1001, the encryption protocol control unit 172 causes the encryption processing unit 173 to execute the following processing. In other words, the encryption protocol control unit 172 causes the encryption processing unit 173 to use the common key CK2 stored as the key information 177 and decrypt the received encrypted data c2, and thereby generate a decryption result d1. When the generation of the plain text is expressed with the format of "plain text=$Dec_{decryption\ key}$ (encrypted text)", the processing of this step can be expressed with Formula 6 below.

$$d1=Dec_{CK2}(c2) \qquad \text{(Formula 6)}$$

The encryption protocol control unit 172 then proceeds to step S1002.

In step S1002, the encryption protocol control unit 172 causes the encryption processing unit 173 to execute the following processing. In other words, the encryption protocol control unit 172 causes the encryption processing unit 173 to generate an exclusive OR Y1 as the XOR of the decryption result d1 generated in step S1001 and the received decryption result c3. The processing of this step can be expressed with Formula 7 below.

[Math 3]

$$Y1=d1 \oplus c3 \qquad \text{(Formula 7)}$$

The encryption protocol control unit 172 then proceeds to step S1003.

In step S1003, the encryption protocol control unit 172 causes the encryption processing unit 173 to execute the following processing. In other words, the encryption protocol control unit 172 causes the encryption processing unit 173 to calculate an exclusive OR Y2 as the XOR of the exclusive OR Y1 calculated in step S1002 and the random number r0 generated in step S601 of FIG. 8. The processing of this step can be expressed with Formula 8 below.

[Math 4]

$$Y2=Y1 \oplus r0 \qquad \text{(Formula 8)}$$

The encryption protocol control unit 172 then proceeds to step S1004.

In step S1004, the encryption protocol control unit 172 causes the encryption processing unit 173 to execute the following processing. In other words, the encryption protocol control unit 172 causes the encryption processing unit 173 to use the key encryption key KEK stored as the key information 177 and decrypt the exclusive OR Y2 calculated in step S1003, and thereby generate a decryption result d2. Here, when the generation of the plain text is expressed with the format of "plain text=$Dec_{decryption\ key}$ (encrypted text)", the processing of this step can be expressed with Formula 9 below.

$$d2=Dec_{KEK}(Y2) \qquad \text{(Formula 9)}$$

Here, when Formula 2 and Formula 5 to Formula 8 are substituted for Formula 9, Formula 10 is obtained.

[Math 5]

$$d2=Dec_{KEK}((Dec_{CK2}(Enc_{CK1}((X \oplus r0) \oplus r1)) \oplus c3) \oplus r0) \qquad \text{(Formula 10)}$$

Furthermore, as explained in step S903, so as long as the information processing device 101 and the in-vehicle communication device 131 are using the proper key, the decryption result c3 will be the random number r1. Furthermore, so as long as the information processing device 101 and the ECU 132 are using the proper key, encryption and decryption will be set off because the common key CK1 and the common key CK2 are the same. Consequently, Formula 10 will be modified as Formula 11 below.

[Math 6]

$$d2=Dec_{KEK}(X \oplus r0 \oplus r1 \oplus r1 \oplus r0) \qquad \text{(Formula 11)}$$

Because the XOR operation will be unaltered when repeated twice, the XOR operation based on r0 and the XOR operation based on r1 will be set off. Furthermore, when Formula 1 is substituted for Formula 11 and the message authentication code Z is expanded, Formula 12 below is obtained.

$$d2=Dec_{KEK}(Enc_{KEK}(K))=K \qquad \text{(Formula 12)}$$

In other words, when the information processing device 101, the in-vehicle communication device 131, and the ECU 132 were using the proper key in all of the previously explained steps, it can be understood that the key K is obtained as d2.

The encryption protocol control unit 172 then proceeds to step S1005.

In step S1005, the encryption protocol control unit 172 determines whether or not the decryption result d2 calculated in step S1004 coincides with the key K stored as the key information 177. The encryption protocol control unit 172 proceeds to step S1006 upon determining that the decryption result d2 coincides with the key K, and proceeds to step S1007 upon determining that the decryption result d2 does not coincide with the key K.

In step S1006, the encryption protocol control unit 172 determines that both the information processing device 101 and the in-vehicle communication device 131 are valid communication partners, and thereby ends the encryption processing 5 depicted in FIG. 12.

In step S1007 which is executed when a negative determination is made in step S1005, the encryption protocol control unit 172 determines that at least either the information processing device 101 or the in-vehicle communication device 131 is an invalid communication partner, and thereby ends the encryption processing 5 depicted in FIG. 12.

The in-vehicle communication device 131 sends a message to the effect that the verification was unsuccessful to the ECU 132 upon receiving a message to the effect that the verification was unsuccessful from the information processing device 101. In other words, the in-vehicle communication device 131 performs the same processing as step S905 of FIG. 11.

The ECU 132 determines that at least either the information processing device 101 or the in-vehicle communication device 131 is an invalid communication partner upon receiving a message to the effect that the verification was unsuccessful from the in-vehicle communication device 131. In other words, the ECU 132 performs the same processing as step S1007 of FIG. 12.

According to the first embodiment of the present invention explained above, the following effects are yielded.

(1) The in-vehicle information communication system 1 in this embodiment is configured from an in-vehicle communication device 131 and an electronic control device, or an ECU 132, which are installed in a vehicle 103, and an information processing device 101 which is not installed in a vehicle. The electronic control device, or the ECU 132, comprises a storage unit 175 which stores a common key CK that is shared with the information processing device 101 in advance, a message generation unit, or an encryption processing unit 173, which generates a message, or an exclusive OR Y0, for authentication (step S603 of FIG. 8), a MAC generation unit, or an encryption processing unit 173, which uses a common key CK2 and generates a message authentication code Z related to the message, or the exclusive OR Y0 (step S604 of FIG. 8), and a communication unit 174 which sends the message generated by the message generation unit and the message authentication code Z generated by the MAC generation unit to the information processing device 101 via the in-vehicle communication device 131. The information processing device 101 comprises a storage unit 114 which stores a common key CK1, a MAC verification unit, or an encryption processing unit 124, which performs authentication of the ECU 132 by verifying the received MAC with the common key CK1 and the received message, or exclusive OR Y0 (step S801 of FIG. 10), a response code generation unit, or an encryption processing unit 124, which generates a response code, or encrypted data c2, based on the received message, or exclusive OR Y0, and the common key CK1 (step S807 of FIG. 10), and a communication unit 120 which, when the verification by the MAC verification unit is successful (step S804 of FIG. 10: YES), sends the response code, or the encrypted data c2, generated by the response code generation unit to the electronic control device, or the ECU 132, via the in-vehicle communication device 131. The electronic control device, or the ECU 132, further comprises a response code verification unit, or an encryption processing unit 173, which performs authentication of the information processing device 101 by verifying the received response code, or encrypted data c2, based on the common key CK2 (step S1001 to S1004 of FIG. 12).

The authentication method according to this embodiment is an authentication method, in an in-vehicle information communication system configured from an in-vehicle communication device 131 and an electronic control device, or an ECU 132, which are installed in a vehicle 103, and an information processing device 101 which is not installed in a vehicle, of the electronic control device, or the ECU 132, and the information processing device 101. The electronic control device, or the ECU 132, generates a message, or an exclusive OR Y0, for authentication, uses a common key CK2 that is shared with the information processing device 101 in advance and generates a message authentication code Z related to the message, or the exclusive OR Y0, and sends the generated message and the generated message authentication code Z to the information processing device 101 via the in-vehicle communication device 131. The information processing device 101 uses the common key CK1 and the received message, or exclusive OR Y0, and verifies the received message authentication code Z, generates a response code, or encrypted data c2, based on the received message and the common key CK1, and, when the verification is successful, sends the generated response code to the electronic control device 132 via the in-vehicle communication device 131. The electronic control device, or the ECU 132, verifies the received response code based on the common key CK2.

According to the configuration and the authentication method of the in-vehicle information communication system 1 described above, it is possible to secure the confidentiality of the secret information related to the ECU because the common key CK1, which is the secret information, is not sent to the in-vehicle communication device 131 which relays the communication of the information processing device 101 and the ECU 132. Furthermore, the information processing device 101 and the ECU 132 can authenticate each other while securing the confidentiality of the secret information.

The information processing device 101 authenticates the ECU 132 by using a message authentication code. This authentication is performed as follows.

The information processing device 101 and the ECU 132 are sharing a common key as a common key CK1 and a common key CK2 in advance. The ECU 132 generates an exclusive OR Y0, uses the common key CK2 and generates a message authentication code Z regarding the exclusive OR Y0, and sends the exclusive OR Y0 and the message authentication code Z to the information processing device 101. The information processing device 101 uses the common key CK1 and generates a message authentication code regarding the received exclusive OR Y0. The information processing device 101 authenticates the ECU 132 when the message authentication code Z received from the ECU 132 and the message authentication code Z that it generated message authentication code coincide. This is because the same message authentication code can only be generated by those having a common key that was shared in advance.

The ECU 132 authenticates the information processing device 101 by using a symmetric key encryption. This authentication is performed as follows.

The information processing device 101 and the ECU 132 are sharing a common key as a common key CK1 and a common key CK2 in advance. The information processing device 101 generates encrypted data c2 by using the common key CK1 and encrypting a value based on the received exclusive OR Y0 via symmetric key encryption. The ECU 132 decrypts the received encrypted data c2, and authenticates the information processing device 101 when the decrypted value coincides with the value based on the exclusive OR Y0. This is because, since symmetric key encryption is being used, valid encrypted data cannot be generated unless the same common key is used.

The calculation processing required for the ECU 132 to perform the foregoing authentication is mainly the generation of the message authentication code and the processing of symmetric key encryption. In other words, because the calculation load is small for both the generation of the message authentication code and the processing of symmetric key encryption described above, these can be sufficiently executed even by an ECU 132 with limited resources.

The algorithm for generating the message authentication code and the algorithm of the symmetric key encryption will suffice so as long as they are common between the information processing device 101 and the ECU 132, and are not limited to specific algorithms. Thus, the algorithm to be used can be easily changed, and it is thereby possible to increase the bit length of the key to match the enhanced functions of the computer, take measures when a vulnerability is discovered in the algorithm, and change to an algorithm that is developed in the future.

(2) The in-vehicle communication device 131 comprises a storage unit 155 which stores a first public key PKS as a public key in public key encryption and a second secret key SKT as a secret key in public key encryption, a first signature generation unit, or an encryption processing unit 153, which uses the second secret key SKT and generates a first signature σ0 as an electronic signature of the message, or the exclusive OR Y0, received from the electronic control device, or the ECU 132 (step S701 of FIG. 9), and a communication unit 154 which sends the message received from the electronic control device, or the ECU 132, the message authentication code Z received from the electronic control device, or the ECU 132, and the first signature generated by the first signature generation unit to the information processing device. The storage unit 114 of the information processing device 101 further stores a first secret key SKS which forms a pair with the first public key PKS and a second public key PKT which forms a pair with the second secret key SKT. The information processing device 101 further comprises a first signature verification unit, or an encryption processing unit 124, which uses the second public key PKT and the received message and verifies the received first signature (step S803 of FIG. 10), a random number generation unit, or an encryption processing unit 124, which generates a random number r1 (step S805 of FIG. 10), an encryption unit, or an encryption processing unit 124, which generates an encrypted random number, or encrypted data c1, by encrypting the random number r1 generated by the random number generation unit (step S806 of FIG. 10) with the second public key PKT, and a second signature generation unit, or an encryption processing unit 124, which uses the first secret key SKS and generates a second signature σ1 as an electronic signature of the response code, or the encrypted data c2, generated by the response code generation unit (step S808 of FIG. 10). The response code generation unit generates the response code, or the encrypted data c2, based on the received message, or exclusive OR Y0, the common CP1, and the random number r1. The communication unit 120 of the information processing device 101 sends the response code, or the encrypted data c2, generated by the response code generation unit, the encrypted random number, or the encrypted data c1, and the second signature σ1 to the in-vehicle communication device 131. The in-vehicle communication device 131 further comprises a second signature verification unit, or an encryption processing unit 153, which uses the first public key PKS and the response code, or the encrypted data c2, received from the information processing device 101 and verifies the received second signature σ1 (step S901 of FIG. 11), and a decryption unit, or an encryption processing unit 153, which uses the second secret key SKT and decrypts the received encrypted random number, or the encrypted data c1, in to decrypted data, or a decryption result c3 (step S903 of FIG. 11). The communication unit 154 of the in-vehicle communication device 131 sends the response code, or the encrypted data c2, received from the information processing device 101, and the decrypted data, or the decryption result c3, to the electronic control device 132. The response code verification unit of the electronic control device, or the ECU 132, verifies the received encrypted data c2 based on the common key CK2 and the decryption result c3.

Consequently, the information processing device 101 and the in-vehicle communication device 131 having a key pair can perform authentication by using a public key and verifying the electronic signature created by the counterparty. This is because, when the verification of the electronic signature is successful, it is possible to understand that the party that created the electronic signature has a secret key corresponding to the public key used for the verification.

Authentication is performed between the information processing device 101 and the ECU 132, and authentication is performed between the information processing device 101 and the in-vehicle communication device 131. Consequently, while authentication is not directly performed between the in-vehicle communication device 131 and the ECU 132, authentication can also be indirectly performed between the in-vehicle communication device 131 and the ECU 132 via the information processing device 101.

(3) The message generation unit, or the encryption processing unit 173, of the electronic control device, or the ECU 132 (step S603 of FIG. 8), generates the message, or the exclusive OR Y0, when an ignition switch of the vehicle 103 in which the electronic control device is installed is turned ON. The MAC generation unit, or the encryption processing unit 173 (step S604 of FIG. 8), generates the message authentication code Z when the message generation unit generates the message. When the MAC generation unit generates the message authentication code Z, the communication unit 174 sends the sends the message generated by the message generation unit and the message authentication code Z generated by the MAC generation unit.

The in-vehicle communication device 131 and the ECU 132 are processing a lot of data when the vehicle 103 is being driven, and it is difficult to secure calculation resources. Thus, authentication can be performed when the vehicle 103 is started; that is, when the ignition switch is turned ON by the operation, which is when the calculation resources are relatively available.

(4) The electronic control device, or the ECU 132, further comprises a second random number generation unit, or an encryption processing unit 173, which generates a second random number r0 (step S601 of FIG. 8). The storage unit 175 of the electronic control device, or the ECU 132, further stores the first secret information, or a key K, and the second secret information, or a key encryption key KEK. The message generation unit, or the encryption processing unit 173, generates encrypted data X by encrypting the key K with the key encryption key KEK, and generates the message, or the exclusive OR Y0, by performing a bit operation, or an exclusive OR, of the encrypted data X and the second random number r0 generated by the second random number generation unit.

Consequently, a new random number r0 is generated and a different exclusive OR Y0 is generated each time the encryption processing 1 is executed. Because the generated random numbers have no regularity, even if the communication via the wireless communication network 102 is intercepted by a third party, it is impossible to predict the random number to be subsequently generated, and the exclusive OR Y0 to be generated based on the random number, and the safety can thereby be improved.

Modified Example 1

In the first embodiment described above, the same secret key; that is, the second secret key SKT was used in both the signature generation processing in step S701 of FIG. 9 and the decryption processing in step S903 of FIG. 11. Nevertheless, a key pair for signature generation/verification and a key pair for encryption/decryption may be separately prepared.

For example, the key information 116 of the information processing device 101 further stores a third public key PKU, the key information 157 of the in-vehicle communication device 131 further stores a third secret key SKU, and the keys are used as follows. The in-vehicle communication device 131 uses the second secret key SKT in step S701 of FIG. 9 in the same manner as the first embodiment, and uses the third secret key SKU in step S903 of FIG. 11. The information processing device 101 uses the second public key PKT in step S803 of FIG. 10 in the same manner as the first embodiment, and uses the third public key PKU in step S806.

According to Modified Example 1, it is possible to further improve the safety.

Modified Example 2

In the first embodiment described above, the key K and the key encryption key KEK were stored as the key information 177 of the ECU 132. Nevertheless, the encryption processing unit 173 may additionally generate two random numbers upon generating the random number r0, and use the generated two random numbers as substitutes of the key K and the key encryption key KEK. Furthermore, the generated two random numbers described above may also be stored and used as the key K and the key encryption key KEK, and two random numbers may once again be generated once step S601 of FIG. 8 is executed a certain number of times to update the key K and the key encryption key KEK.

Modified Example 3

In the first embodiment described above, the processing of step S511 and step S512 shown in FIG. 7 is started by the ECU 132 when the ignition key is turned ON by the user, and the subsequent processing is started immediately after the preceding processing is completed. Nevertheless, the timing that the processing of each step is started is not limited thereto.

For example, the processing of step S511 and step S512 may be started based on a command from the user or the information processing device 101. The processing of step S511 and step S512 may also be started when the processing load of the in-vehicle communication device 131 or the ECU 132 becomes a predetermined threshold or less.

The subsequent processing does not need to be started even when the preceding processing is completed until the processing load of the relevant device becomes a predetermined threshold or less, or the subsequent processing may be started only when predetermined conditions are satisfied. For example, the processing of step S532 may be started only when the information processing device 101 detects that the firmware of the communicating ECU 132 is not the latest version.

Modified Example 4

In the first embodiment described above, both the key K and the key encryption key KEK are stored as the key information 177 of the ECU 132. Nevertheless, only one of either the key K or the key encryption key KEK may be stored.

For example, when the key encryption key KEK is not stored in the key information 177, the key K is used as the encrypted data X in step S602 of FIG. 8, and the processing of step S1004 of FIG. 12 is omitted.

Modified Example 5

The message authentication code Z may also be generated based on procedures that differ from the first embodiment described above. For example, the exclusive OR of the key K and the random number r0 may be encrypted using the key encryption key KEK, and the message authentication code Z may be generated by using the common key CK2. In other words, the calculation formula of the message authentication code Z according to Modified Example 1 can be expressed with Formula 13 below.

Math 7

$$Z = MAC_{CK2}(Enc_{KEK}(K \oplus r0)) \tag{Formula 13}$$

Modified Example 5

In the first embodiment described above, whether or not the communication partner is valid was determined in the encryption processing 5 performed by the ECU 132 based on whether the decryption result d2 coincides with the key K (step S1005 of FIG. 12). Nevertheless, whether or not the communication partner is valid may also be determined based on whether the exclusive OR Y1 calculated in step S1002 coincides with the exclusive OR Y0. In the foregoing case, the ECU 132 stores the exclusive OR Y0 sent in step S605 of FIG. 8 in the storage unit 175, and uses the stored exclusive OR Y0 in the foregoing determination of coincidence.

According to Modified Example 1, the computational effort can be reduced in an ECU 132 with limited resources.

The first embodiment described above may also be further modified as follows.

(1) The information processing device 101 does not necessarily have to comprise the entire hardware configuration described above, and, for example, the information processing device 101 does not have to comprise the display 112 or the keyboard 113.

(2) The transmission/reception table 117 and the information management table 158 do not necessarily have to include all of the information described above, and may also include information other than the information described above. For example, the information management table 158 may also include an information processing device public information ID for identifying the key information to be used in authenticating the information processing device 101.

(3) The storage unit 114 may store information other than the information described above, and may also store, for example, various types of firmware of the in-vehicle communication device 131 and the ECU 132.

(4) A part of the processing performed by the processing units 121, 151, 171 may also be realized with a hardware circuit. For example, the random numbers may also be generated with a random number generator.

Second Embodiment

The second embodiment of the in-vehicle information communication system according to the present invention is now explained with reference to FIG. 13 to FIG. 15. In the ensuing explanation, the same constituent elements as the first embodiment are given the same reference numeral, and only the differences are mainly explained. If no explanation is specifically provided, then that constituent element is the same as the first embodiment. This embodiment mainly differs from the first embodiment with respect to the point that a session key is used in the firmware writing sequence.

(Configuration)

The configuration of the in-vehicle information communication system 1 according to the second embodiment differs from the first embodiment with regard to the point that a session key is stored in the storage unit 114 of the information processing device 101, and the storage unit 175 of the ECU 132. However, the session key is not shared in advance as with the key information, and is generated, or delivered in an encrypted state, once the authentication flow is started as described later.

In the second embodiment, the operation of the program differs from the first embodiment. Specifically, the overview of the authentication processing flow explained with reference to FIG. 7 in the first embodiment is the same as the first embodiment, and the encryption processing 1 of step S512, the encryption processing 2 of step S522, and the encryption processing 3 of step S532 differ from the first embodiment.

(Flowchart of Encryption Processing 1)

Figure 13:
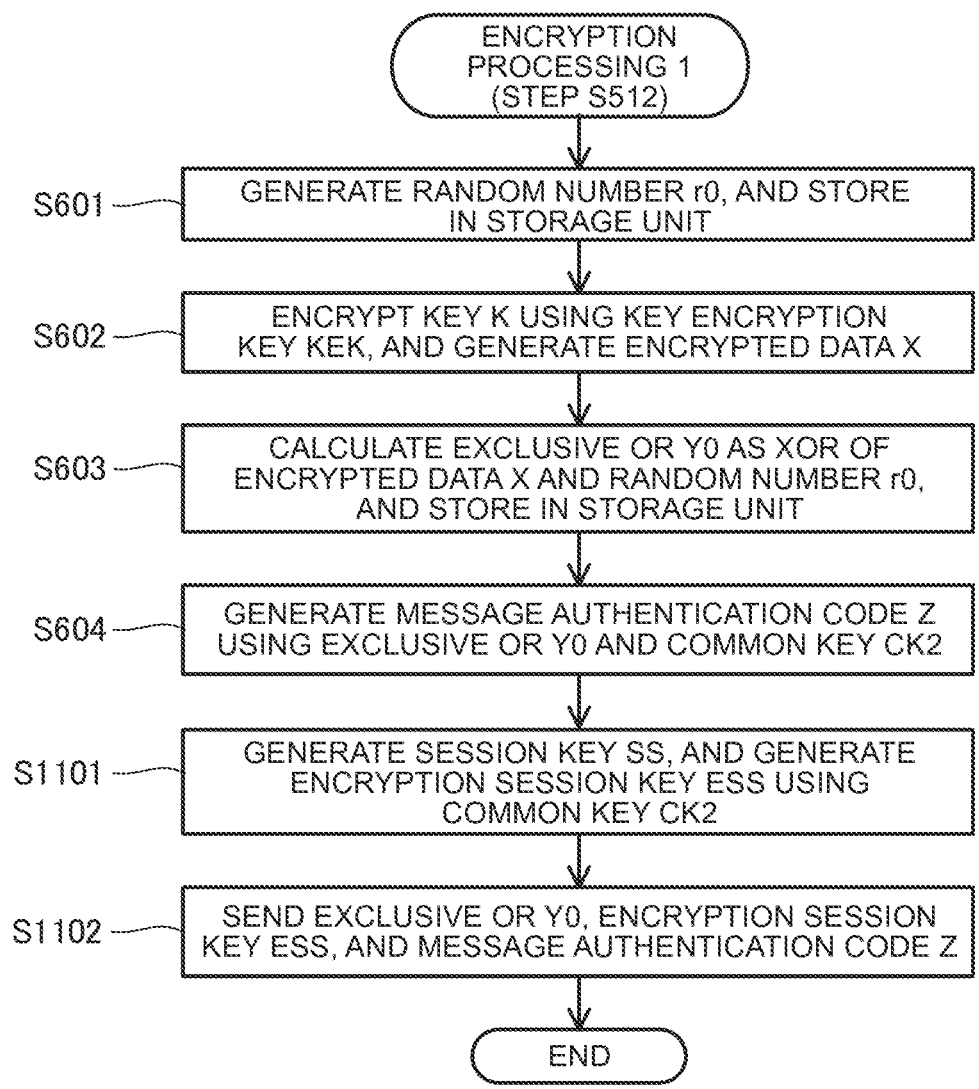
FIG. 13 is a flowchart showing the details of the encryption processing 1 in the second embodiment.

FIG. 13 is a flowchart showing a specific example of the encryption processing 1 in the second embodiment. Processing that is the same as the first embodiment is given the same step number, and the explanation thereof is omitted.

In step S1101 which is executed after step S604, the encryption protocol control unit 172 causes the encryption processing unit 173 to execute the following processing. In other words, the encryption protocol control unit 172 causes the encryption processing unit 173 to generate a session key SS, which is a random number, and stores the generated session key SS in the storage unit 175, and additionally causes the encryption processing unit 173 to encrypt the session key SS by using the common key CK2 stored as the key information 177, and thereby generate an encrypted session key ESS. The encryption protocol control unit 172 then proceeds to step S1102.

In step S605, the encryption protocol control unit 172 sends the exclusive OR Y0 generated in step 603, the message authentication code Z generated in step 604, and the encrypted session key ESS generated in step S1101 to the in-vehicle communication device 131 by using the communication unit 174. The encryption processing 1 in the second embodiment depicted in FIG. 13 is thereby ended.

(Flowchart of Encryption Processing 2)

Figure 14:
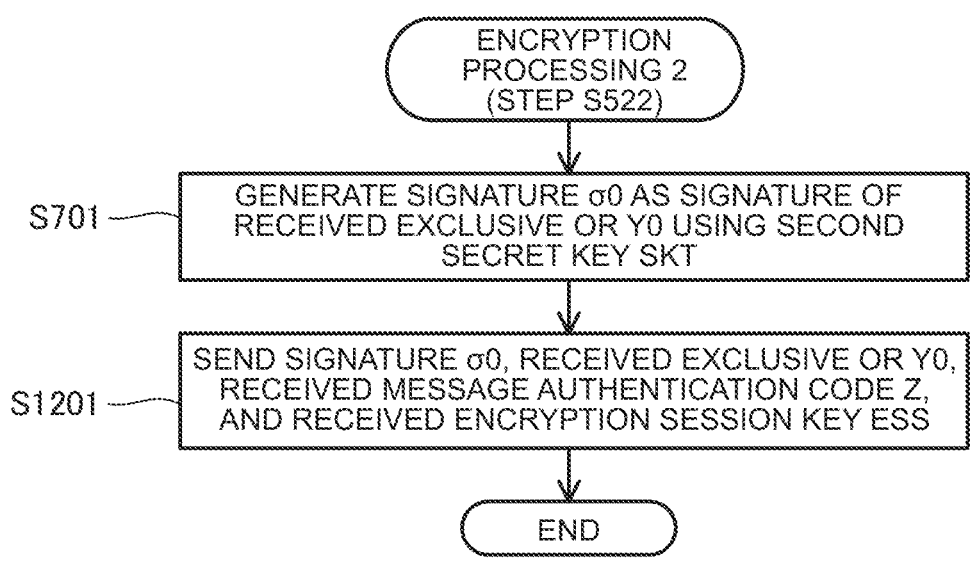
FIG. 14 is a flowchart showing the details of the encryption processing 2 in the second embodiment.

FIG. 14 is a flowchart showing a specific example of the encryption processing 2 in the second embodiment. Processing that is the same as the first embodiment is given the same step number, and the explanation thereof is omitted.

In step S1201 which is executed after step S701, the encryption protocol control unit 152 sends the signature σ0 generated in step S701, the received exclusive OR Y0, the received message authentication code Z, and the received encrypted session key ESS to the information processing device 101 by using the communication unit 154. The encryption processing 2 in the second embodiment depicted in FIG. 14 is thereby ended.

(Flowchart of Encryption Processing 3)

FIG. 15 is a flowchart showing a specific example of the encryption processing 3 in the second embodiment. Processing that is the same as the first embodiment is given the same step number, and the explanation thereof is omitted.

In step S1301 which is executed when a positive determination is made in step S804, the encryption protocol control unit 123 causes the encryption processing unit 124 to execute the following processing. In other words, the encryption protocol control unit 123 causes the encryption processing unit 124 to use the common key CK1 stored as the key information 116 and decrypt the received encrypted session key ESS, and stores this as the decrypted session key DSS in the storage unit 114. The encryption protocol control unit 123 then proceeds to step S805.

(Communication after Completion of Authentication)

In the communication after the completion of authentication, the ECU 132 uses the session key SS and encrypts the data to be sent to the information processing device 101, and uses the session key SS to decrypt the data received from the information processing device 101.

In the communication after the completion of authentication, the information processing device 101 uses the decrypted session key DSS and encrypts the data to be sent to the ECU 132, and uses the decrypted session key DSS and decrypts the data received from the ECU 132.

Because the session key SS and the decrypted session key DSS will be the same so as long as the information processing device 101 and the ECU 132 are using the proper key, the communication between the information processing device 101 and the ECU 132 can be encrypted.

According to the second embodiment of the present invention explained above, the following effects are yielded.

(1) The ECU 132 generates a session key SS for use in the communication after the completion of authentication, encrypts the generated session key SS by using a common key CK2 and generates an encrypted session key ESS, and sends the generated encrypted session key ESS to the information processing device 101. The information processing device 101 decrypts the received encrypted session key ESS by using a common key CK1 and thereby obtains a decrypted session key DSS.

Thus, the communication after the completion of authentication can be encrypted by using the session key SS and the decrypted session key DSS. Furthermore, because the session key SS is generated each time the encryption processing 1 is executed, even if the session key SS is divulged to the outside at a certain time, it is possible to limit the influence of such divulgence.

The respective embodiments and modified examples described above may also be combined with each other.

While various embodiments and modified examples were explained above, the present invention is not limited thereto. Other modes that can be considered with the range of the technical concept of the present invention are also covered by the present invention.

The disclosure of the following priority application is incorporated herein by reference. Japanese Patent Application No. 2015-130315 (filed on Jun. 29, 2015)

REFERENCE SIGNS LIST

1 . . . In-vehicle information communication system
101 . . . Information processing device
102 . . . Wireless communication network
103 . . . Vehicle
114, 155, 175 . . . Storage unit
116, 157, 177 . . . Key information
117 . . . Transmission/reception table
120, 154, 174 . . . Communication unit
121, 151, 171 . . . Processing unit
123, 152, 172 . . . Encryption protocol control unit 124, 153, 173 ... Encryption processing unit
131, 154, 174 ... In-vehicle communication device
132 ... ECU
158 ... Information management table
K ... Key
X ... Encrypted data
Z ... Message authentication code
SS ... Session key
Y0 ... Exclusive OR
c1, c2 ... Encrypted data
c3 ... Decryption result
d1, d2 ... Decryption result
r0, r1 ... Random number
CK1 ... Common key
CK2 ... Common key
KEK ... Key encryption key
PKS ... First public key
PKT ... Second public key
SKS ... First secret key
SKT ... Second secret key

The invention claimed is:

1. An information communication system configured from an in-vehicle communication device and an electronic control device which are installed in a vehicle, and an information processing device which is not installed in a vehicle,
wherein the electronic control device comprises:
an electronic control device storage unit which stores a common key that is shared with the information processing device in advance;
a message generation unit which generates a message for use in authentication;
a message authentication code generation unit which uses the common key and generates a message authentication code related to the message; and
an electronic control device communication unit which sends the message generated by the message generation unit and the message authentication code generated by the message authentication code generation unit to the information processing device via the in-vehicle communication device,
wherein the information processing device comprises:
an information processing device storage unit which stores the common key;
a message authentication code verification unit which performs authentication of the electronic control device by verifying the received message authentication code using the common key and the received message;
a response code generation unit which generates a response code by encrypting a value based on the received message via symmetric key encryption with the common key; and
an information processing device communication unit which, when the verification by the message authentication code verification unit is successful, sends the response code generated by the response code generation unit to the electronic control device via the in-vehicle communication device, and
wherein the electronic control device further comprises:
a response code verification unit which performs authentication of the information processing by verifying the received response code based on the common key.

2. The information communication system according to claim 1,
wherein the in-vehicle communication device comprises:
an in-vehicle communication device storage unit which stores a first public key as a public key in public key encryption and a second secret key as a secret key in public key encryption;
a first signature generation unit which uses the second secret key and generates a first signature as an electronic signature of the message received from the electronic control device; and
an in-vehicle communication device communication unit which sends the message received from the electronic control device, the message authentication code received from the electronic control device, and the first signature generated by the first signature generation unit to the information processing device,
wherein the information processing device storage unit of the information processing device further stores a first secret key which forms a pair with the first public key and a second public key which forms a pair with the second secret key,
wherein the information processing device further comprises:
a first signature verification unit which performs authentication of the in-vehicle communication device by verifying the received first signature using the second public key and the received message;
a first random number generation unit which generates a first random number;
an encryption unit which generates an encrypted random number by encrypting the first random number generated by the first random number generation unit with the second public key; and
a second signature generation unit which uses the first secret key and generates a second signature as an electronic signature of the response code generated by the response code generation unit,
wherein the response code generation unit generates the response code based on the received message, the common key, and the first random number,
wherein information processing device communication unit sends the second signature to the in-vehicle communication device,
wherein the in-vehicle communication device further comprises:
a second signature verification unit which performs authentication of the information processing device by verifying the received second signature using the first public key and the response code received from the information processing device; and
a decryption unit which uses the second secret key and decrypts the received encrypted random number into decrypted data, and
wherein the in-vehicle communication device communication unit sends the response code received from the information processing device and the decrypted data to the electronic control device, and
wherein the response code verification unit of the electronic control device verifies the received response code based on the common key and the decrypted data.

3. The information communication system according to claim 1,
wherein the message generation unit of the electronic control device generates the message when an ignition switch of the vehicle, in which the electronic control device is installed, is turned ON, wherein the message authentication code generation unit generates the message authentication code when the message generation unit generates the message, and wherein, when the message authentication code generation unit generates the message authentication code, the electronic control device communication unit sends the message generated by the message generation unit and the message authentication code generated by the message authentication code generation unit.

4. The information communication system according to claim 1, wherein the electronic control device further comprises a second random number generation unit which generates a second random number, wherein the electronic control device storage unit further stores first secret information and second secret information, and wherein the message generation unit generates encrypted data by encrypting the first secret information with the second secret information, and generates the message by performing a bit operation of the encrypted data and the second random number generated by the second random number generation unit.

\* \* \* \* \*